United States Patent Office 3,793,300
Patented Feb. 19, 1974

3,793,300
FLEXIBLE POLYESTER URETHANE FOAMS USING LIQUID SILOXANE-OXYALKYLENE POLYMERIC FOAM STABILIZERS
Bela Prokai, Mahopac, and Bernard Kanner, West Nyack, N.Y., assignors to Union Carbide Corporation, New York, N.Y.
No Drawing. Original application Apr. 8, 1971, Ser. No. 132,534. Divided and this application June 26, 1972, Ser. No. 266,203
Int. Cl. C08g 22/44
U.S. Cl. 260—2.5 AH    15 Claims

ABSTRACT OF THE DISCLOSURE

Organosilicone polymers are provided containing monomeric units A, B and C where A is $SiO_{4/2}$, B is a polyfunctional siloxy unit in which silicon is bonded to at least one organic moiety bearing a poly(oxyalkylene) chain, and C is a monofunctional triorganosiloxy unit, and in which there are from about 0.4 to about 2 moles of A, and from about 0.2 to about 2 moles of C, per mole of B. The polymers are useful as surfactants and find particular application in the manufacture of flexible polyester urethane cellular products, including flame-retarded foams.

---

This is a division of application Ser. No. 132,534 filed Apr. 8, 1971.

BACKGROUND OF THE INVENTION

The present invention relates to novel organosilicone polymers, and their use in the manufacture of urethane cellular products, particularly flexible polyester urethane foams including flame-retarded foams.

It is well known that the urethane linkages of urethane foams are formed by the exothermic reaction of a polyfunctional isocyanate and a polyfunctional active hydrogen-containing compound in the presence of a catalyst, and that the cellular structure of the foam is provided by gas evolution and expansion during the urethane-forming reaction. In accordance with the "one-shot process" which is the most widely used industrial technique, direct reaction is effected between all of the raw materials which include the polyisocyanate, the active hydrogen-containing compound, the catalyst system, blowing agent and surfactant. A major function of the surfactant is to stabilize the urethane foam, that is, prevent collapse of the foam until the foamed product has developed sufficient gel strength to become self-supporting.

It is also well known that suitable active hydrogen-containing compounds include polyether polyols and polyester polyols. From the standpoint of their chemical structure, therefore, urethanes are usually classified as polyether and polyester urethanes, respectively. Urethane foams also differ with respect to their physical structure and, from this standpoint, are generally classified as flexible, semi-flexible or rigid foams.

Although certain techniques of urethane manufacture such as the "one-shot process" and certain components of the foam formulation such as the polyisocyanates, amine catalyst and blowing agent, are generally useful, a specific problem associated with the production of a particular type of urethane foam and the solution thereto are often peculiar to the particular chemical and physical structure of the desired foamed product. Thus, a significant development in the production of a polyether foam or a rigid foam, for example, may not be generally applicable to the production of other cellular products. In particular, the efficacy of the foam stabilizer is usually selective with respect to the formation of a particular type of foam. For example, although flexible polyester foam was originally made using conventional organic surfactants or emulsifiers, such compounds were not effective for the manufacture of flexible polyether foam. As urethane technology advanced and end-uses became more varied, it became apparent that certain deficiencies in the quality of flexible polyester foam such as the presence of splits and a non-uniform cell structure were attributable, at least in part, to the organic surfactants employed. However, the mere substitution of the organic surfactants with various polysiloxane-polyoxyalkylene block copolymers which had been used as foam stabilizers with satisfactory results in the production of other types of urethane foams (e.g., in the production of polyether urethane foams and certain rigid polyester urethane foams), did not produce completely satisfactory flexible polyester foams. A significant development in polyester foam manufacture was the discovery that a satisfactory combination of uniform cell structure and freedom from splits was achieved by using a particular combination of foam stabilizing ingredients. This latter combination comprises (a) an anionic organic surfactant that is soluble in the polyester polyol reactant at room temperature and that is capable of lowering the surface tension of the polyester resin reactant when dissolved therein and (b) a polysiloxane-polyoxyalkylene block copolymer surfactant characterized by a particular molecular weight (from 600 to 17,000), siloxane content (from 14 to 40 weight percent based on the weight of the copolymer) and oxyethylene content (at least 75 weight percent based on the total amount of oxyalkylene groups in the copolymer). This particular advance in polyester foam manufacture is described in greater detail in Belgian Pat. No. 724,951 corresponding to U.S. application Ser. No. 688,702, filed Dec. 7, 1967, by Lawrence Marlin, now U.S. Pat. No. 3,594,334.

Another class of organosilicone polymers known to the art are those composed of the following two types of silicon-containing units: (1) inorganic tetrafunctional units in which the four valences of silicon are bonded to oxygen ($SiO_{4/2}$), and (2) the monofunctional trimethylsiloxy units, $(CH_3)_3SiO_{1/2}$. Polymers of this type in which the $SiO_{4/2}$:$(CH_3)_3SiO_{1/2}$ mole ratio is from 0.8:1 to 2.0:1 are described in Belgian Pat. No. 720,212 as effective stabilizers of flexible polyether urethane foams. On the other hand, copolymers composed of the aforesaid $SiO_{4/2}$ and $(CH_3)_3SiO_{1/2}$ units are ineffective stabilizers of flexible polyester foam.

Also reported in the prior art (U.S. Pat. No. 3,511,788) are polymers containing the aforesaid inorganic tetra-functional units in combination with $(CH_3)_3SiO_{1/2}$ units either as the sole type of monofunctional unit or in further combination with a second type of monofunctional unit in which the silicon atom is bonded to two methyl groups and a hydroxyl-terminated poly(oxyalkylene) chain which is linked to the silicon atom by a divalent trimethylene group. In the polymers of U.S. Pat 3,511,788, the proportion of tetra- to total monofunctional units ranges from 1:0.6 to 1:1.2. Although the polymers of the aforesaid patent are reported therein as useful frothing agents in the manufacture of polyvinyl chloride plastisol foams and foaming agents for simple organic solvents, they are ineffective stabilizers of flexible polyester foam.

An additional factor which further complicates this area of technology is the need to minimize and ultimately overcome the major drawback of urethane foams in their ability to ignite readily and to burn. In view of the fact that urethane foams are used in applications where fire creates a hazard, a great deal of effort has been and is being expended to impart and improve their flame-retardant properties. Here too, however, specific types of foams have selective requirements. Flame-retardancy is particularly difficult in the area of flexible foam manufacture in view of the delicate open-cell nature of flexible foams as compared with the closed-cell and highly cross-linked rigid foams. The problem is compounded by the desirability of achieving fire-retardant properties without any substantial sacrifice of foam quality required for a particular end-use application.

It is an object of this invention to provide new and useful organosilicone polymers which have particular application in the manufacture of cellular polyurethanes.

Another object is to provide new and improved organosilicone polymers which as such are potent stabilizers of flexible polyester urethane foam including flame-retarded foam.

Another object is to provide organosilicone polymers having the aforesaid characteristics, in a form which results in clear, homogeneous solutions when premixed with water and an amine urethane-forming catalyst.

A further object is to provide organosilicone polymers containing inorganic, tetrafunctional silicon-containing untis as one type of monomeric unit, which polymers are effective stabilizers of flexible polyester urethane foam, and a method for the preparation of said polymers.

A further object is to provide particular flexible polyester urethane cellular products having fire-resistant properties, and a process for the manufacture thereof.

Various other objects and advantages of this invention will become apparent to those skilled in the art from the accompanying description and disclosure.

SUMMARY OF THE INVENTION

In accordance with the teachings of this invention, organosilicone polymers are provided which comprise: (A) inorganic, tetrafunctional silicon-containing units in which the four valences of the respective silico atoms are satisfied by bonds to oxygen, (B) polyfunctional siloxy units in which silicon is bonded to at least one organic moiety bearing a poly(oxyalkylene) chain, and (C) monofunctional triorganosiloxy units, and in which the mole ratio of said tetrafunctional to said polyfunctional units is from about 0.4:1 to about 2:1 and the mole ratio of said monofunctional to said polyfunctional units is from about 0.2:1 to about 2:1.

For convenience, the aforesaid monomeric units of the polymers of this invention are referred to herein generally as the A, B and C units, respectively.

In addition to the aforesaid novel class of organosilicone polymers, the present invention also provides a process for producing a flexible polyurethane foam which comprises reacting and foaming a reaction mixture of:

(I) A polyester polyol containing an average of at least two hydroxyl groups per molecule;

(II) A polyisocyanate containing at least two isocyanato groups per molecule, said polyester polyol and polyisocyanate, taken together, being present in the mixture in a major amount and said polyester polyol and polyisocyanate being present in the mixture in the relative amounts required to produce the polyurethane foam;

(III) A blowing agent in a minor amount sufficient to foam the mixture;

(IV) A catalytic amount of a catalyst for the reaction of the polyester polyol and the polyisocyanate to produce the polyurethane; and (V) A foam stabilizing amount of the organosilicone polymers of this invention comprising the aforesaid tetrafunctional, organo-substituted polyfunctional and monofunctional silicon-containing units A, B and C.

The organosilicone polymers of this invention can be introduced to the urethane foam-producing reaction mixture either as such, as a blend with various organic additives, or as a component of an aqueous premixture which also comprises the catalyst for the polyester polyol/polyisocyanate reaction.

In addition to their effectiveness for stabilization of flexible polyester foam, the organosilicone polymers of this invention have the further advantageous property of allowing for the formation of flame-retarded foams.

The present invention also relates to methods for the preparation of the novel organo-silicone polymers described herein, particular solution compositions thereof, and to the foams which are made therewith.

DESCRIPTION OF THE PREFERRED EMBODIMENTS

The functionality of the respective types of structural units (A, B and C) of the polymers of this invention defines the number of oxygen atoms to which the silicon atom (Si) of any particular unit is bonded. Since each oxygen atom is shared by a silicon atom (Si') of another unit, functionality also denotes the number of linkages by which the particular unit can be bonded to another portion of the polymer through —Si—O—Si'— bonds. Accordingly, in expressing the structural and empirical formulas of the respective units of the polymers of this invention, fractional subscripts are used in which the value of the numerator defines functionality (i.e., the number of oxygen atoms associated with the silicon atom of the particular unit), and the denominator, which in each instance is 2, denotes that each oxygen atom is shared with another silicon atom.

Thus, in the inorganic tetrafunctional units (A) of the polymers of this invention, each of the four valences of silicon is associated with oxygen as shown by the structure, $$-O_{1/2}-\underset{\underset{O_{1/2}}{|}}{\overset{\overset{O_{1/2}}{|}}{Si}}-O_{1/2}- \qquad (A)$$

and expressed by the empirical formula, $SiO_{4/2}$, which in abbreviated form is often expressed simply as $SiO_2$.

In the organo-substitued polyfunctional structural units (B) of the polymers of this invention, from two to three valences of the tetravalent silicon atom are associated with oxygen and at least one valence is satisfied by a bond to a carbon atom of an organic moiety bearing a poly(oxyalkylene) chain. For the sake of brevity, the said poly(oxyalkylene) chain-bearing organic moiety is also referred to herein as the "polyether group" and is designated herein by the symbol "E." When the B unit is difunctional, the remaining valence of silicon is satisfied by a bond to a carbon atom of either a second polyether group (E) or a monovalent hydrocarbon radical, designated herein by the symbol "R." Consistent with this definition, the polyfunctional siloxy units (B) of the polymers of this invention have the following general structural formula:

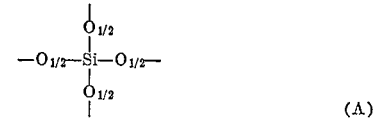

wherein E is the aforesaid poly(oxyalkylene) chain-bearing organic moiety (i.e., a polyether group), R is a monovalent hydrocarbon radical, $e$ is an integer having a value of from 1 to 2, $f$ has a value of from 0 to 1, and the sum of $e+f$ is from 1 to 2.

When the sum $e+f$ of general Formula B is 2, the polyfunctional siloxy units (B) of the polymers of this invention are difunctional and have the structural formula,

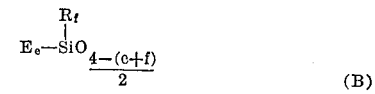

and the empirical formula

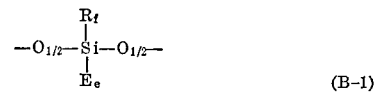

which in abbreviated form is expressed as $(E)_e(R_f)SiO$, wherein $f$ has a value of one when $e$ is one, and $f$ is zero when $e$ is two. Formulas B and B-1, therefore, include both the mono(polyether)-substituted and the di(polyether)-substituted difunctional units, $(E)(R)SiO_{2/2}$ and $E_2SiO_{2/2}$, respectively.

When the sum $e+f$ of general Formula B is 1, the polyfunctional siloxy units (B) are trifunctional and have the structural formula,

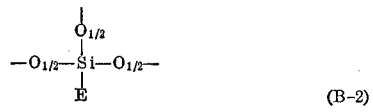
(B-2)

and the empirical formula, $E\text{---}SiO_{3/2}$.

In view of their polyfunctionality, the three types of B units encompassed by general Formula B have the common characteristic of being polymer-building units. It is to be understood that the organosilicone polymers of this invention may contain either one of the two types of difunctional structures encompassed by Formula B-1 [that is, $(R)(E)SiO_{2/2}$ or $E_2SiO_{2/2}$] or the trifunctional structure of Formula B-2 (that is, $E\text{---}SiO_{3/2}$), as essentially the sole type of polyfunctional unit (B), or the polymers may contain any combination thereof such as, for example, a combination of the $(R)(E)SiO_{2/2}$ and $E\text{---}SiO_{3/2}$ monomeric units.

In the monofunctional siloxy units (C) of the polymers of this invention, one valence of silicon is associated with oxygen and each of the remaining three valences is satisfied by a bond to a carbon atom of a monovalent organic group, designated herein as R°, as shown by the general structural formula,

(C)

which has the empirical formula, $R°_3SiO_{1/2}$. The R° group can be a monovalent hydrocarbon group, designated herein as R', or the R° group can be a poly(oxyalkylene) chain-bearing organic moiety, also referred to herein as a "polyether group" and designated by the symbol "E'". Within any particular $R°_3SiO_{1/2}\text{---}$ unit, or, as between different $R°_3SiO_{1/2}\text{---}$ units, the R° groups may be the same or different. Thus in the monofunctional units (C), from 0 to 3 monovalent hydrocarbon groups (R') and correspondingly from 3 to 0 of the aforesaid polyether groups (E') can be bonded to silicon without departing from the scope of this invention. Consistent with this definition, the monofunctional siloxy units (C) of the polymers of this invention have the following more specific formula:

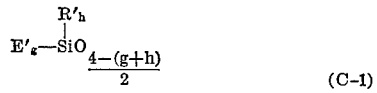
(C-1)

wherein R' is a monovalent hydrocarbon group, E' is the aforesaid polyether group, and each of $g$ and $h$ has a value of from 0 to 3, provided the sum $g+h$ is 3. The preferred monofunctional siloxy units encompassed by Formula C-1, are those in which $g$ has a value of from 0 to 1 and $h$ has a corresponding value of from 3 to 2.

In view of their monofunctionality, the C units of the polymers of this invention cannot extend the polymer network since they are chain-terminating groups. This is in marked contrast to the reactivity of the above-described polyether-substituted di- and tri-functional monomeric B units encompassed by general Formula B which, in view of their polyfunctionality, are chain-extending or polymer-building monomeric units.

The essential polyether group (E) of the di- and tri-functional siloxy units encompassed by Formula B above, and, when present, the polyether group (E') of the monofunctional siloxy units (C), are more specifically defined by the formula, $WO\text{---}(C_nH_{2n}O)_d\text{---}L\text{---}$, wherein $WO\text{---}(C_nH_{2n}O)_d\text{---}$ is an organic end-blocked poly(oxyalkylene) chain and $\text{---}L\text{---}$ is a bivalent organic radical that links the poly(oxyalkylene) chain, $\text{---}(C_nH_{2n}O)_d\text{---}$, to silicon. When this more specific expression is used in Formula B above in place of E, the following more detailed definition of the organo-substituted polyfunctional siloxy units (B) of the polymers of this invention is provided:

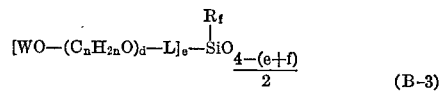
(B-3)

wherein, as above defined, $e$ has a value of from 1 to 2, $f$ has a value of from 0 to 1, the sum $e+f$ is from 1 to 2, and R is a monovalent hydrocarbon radical. Similarly, when the aforesaid formula of the polyether group is used in Formula C-1 above in place of E', the monofunctional siloxy units (C) of the polymers of this invention are expressed by the following more specific formula:

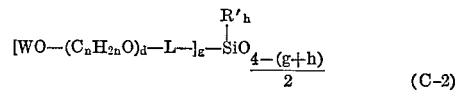
(C-2)

wherein as above defined, $g$ and $h$ can each have a value of from 0 to 3, provided the sum of $g+h$ is 3, and R' is a monovalent hydrocarbon group. In the poly(oxyalkylene) chain, $\text{---}(C_nH_{2n}O)_d\text{---}$, of the respective monomeric units B and C of Formulas B-3 and C-2 above, $d$ is a number having an average value of from about 4 to about 30, and $n$ can have a value of from 2 to 4, provided at least 75 weight percent of the poly(oxyalkylene) chain is constituted of oxyethylene units, $\text{---}(C_2H_4O)\text{---}$. Usually, the average value of $d$ is from about 5 to about 15, and the average value of $n$ is from 2 to 2.25. The other oxyalkylene units with which the oxyethylene groups may be in combination are oxypropylene, $\text{---}(C_3H_6O)\text{---}$, and oxybutylene, $\text{---}(C_4H_8O)\text{---}$, units. When the oxyethylene units are present in combination with other oxyalkylene units, the units of different types can be randomly distributed throughout the poly(oxyalkylene) chain or they can be grouped in respective sub-blocks, provided the total average content of $\text{---}(C_2H_4O)\text{---}$ in the chain is at least 75 weight percent. Preferably, the total average poly(oxyethylene) content of the chain, $\text{---}(C_nH_{2n}O)_d\text{---}$, is from about 85 to about 100 weight percent.

The bivalent organic groups represented by $\text{---}L\text{---}$ in the above Formulas B-3 and C-2 can be any of a variety of radicals having from 2 to 14 carbon atoms and are usually hydrocarbon groups. Illustrative are such groups as:

$$\text{---}R''\text{---}$$
$$\text{---}R'''\text{---}$$
$$\text{---}R''\text{---}R'''\text{---}$$
$$\text{---}R'''\text{---}R''\text{---}R'''\text{---}$$

and the like, wherein R'', in each instance, is a bivalent branched or straight chain alkylene radical having the formula, $\text{---}C_mH_{2m}\text{---}$, $m$ being an integer having a preferred value of from 2 to 4, of which 3 is particularly preferred, and R''' in each instance is an arylene group having from 6 to 14 carbon atoms, including alkyl-substituted arylene groups. Typical examples of the linking groups ($\text{---}L\text{---}$) are: ethylene ($\text{---}CH_2CH_2\text{---}$); trimethylene $$(\text{---}CH_2CH_2CH_2\text{---})$$

propylene [$\text{---}CH_2CH(CH_3)\text{---}$]; tetramethylene; methylpropylene [$\text{---}CH_2CH(CH_3)CH_2\text{---}$]; ethylethylene $$[\text{---}CH_2CH(C_2H_5)\text{---}]$$

phenylene ($\text{---}C_6H_4\text{---}$); tolylene [$\text{---}(CH_3)_2C_6H_2\text{---}$]; biphenylene ($\text{---}C_6H_4\text{---}C_6H_4\text{---}$); $\text{---}C_6H_4\text{---}CH_2\text{---}C_6H_4\text{---}$; $\text{---}C_6H_4\text{---}C(CH_3)_2\text{---}C_6H_4$; and the like.

As is evident from the above-described classes of bivalent linking radicals ($\text{---}L\text{---}$), the unsatisfied valences thereof are associated with carbon and thus form a carbon-to-oxygen bond with the poly(oxyalkylene) chain and a carbon-to-silicon bond with the silicon atom of the respective siloxy units.

As further indicated by the above Formulas B-3 and C-2, the poly(oxyalkylene) chain, —(C$_n$H$_{2n}$O)$_d$—, is terminated by the organic group, WO—, wherein W is a monovalent organic capping group. Illustrative of the organic caps encompassed by W are such groups as:

R° °—
R° °NHC(O)—, and
R° °C(O)— wherein R° °, in each instance, is a monovalent hydrocarbon radical having from 1 to 12 carbon atoms, and is usually free of aliphatic unsaturation. The groups (WO—) which end-block the poly(oxyalkylene) chains are, therefore, corresponding R° °O—, R° °NHC(O)O— and R° °C(O)O— monovalent organic radicals. In the aforesaid capping (W) and terminal (WO—) gorups, R° ° can be any of the following: an alkyl group including linear and branched chain alkyl groups having the formula, C$_y$H$_{2y+1}$— wherein y is an integer of from 1 to 12, such as, for example, methyl, ethyl, n-propyl, isopropyl, n-butyl, t-butyl, octyl and dodecyl groups; a cycloaliphatic radical including monocyclic and bicyclic groups such as, for example, cyclopentyl, cyclohexyl and bicyclo[2.2.1]heptyl groups; an aromatically unsaturated group including aryl, alkaryl and aralkyl radicals such as, for example, phenyl, naphthyl, xylyl, tolyl, cumenyl, mesityl, t-butyl-phenyl, benzyl, beta-phenylethyl and 2-phenylpropyl groups; alkyl- and aryl-substituted cycloaliphatic radicals such as, for example, methylcyclopentyl and phenylcyclohexyl radicals; and the like. It is evident, therefore, that the terminal group (WO—) of the respective essential polyether groups (E) of the di- and tri-functional siloxy units (B) of the polymers of this invention, as well as the terminal groups of the polyether groups (E') which may or may not be present in the monofunctional siloxy units (C), can be corresponding alkoxy, aryloxy, aralkoxy, alkaryloxy, cycloalkoxy, acyloxy, aryl—C(O)O—, alkyl carbamate and aryl carbamate groups.

The generally preferred R° ° groups are phenyl, lower alkyl radicals, the lower alkyl-substituted aryl groups and the aryl-substituted lower alkyl groups, wherein the term "lower alkyl" denotes C$_1$–C$_4$ alkyl radicals. Therefore, illustrative of the preferred capping groups represented by W of the above Formulas B-3 and C-2 are: methyl, ethyl, propyl, butyl, phenyl, benzyl, phenylethyl (C$_6$H$_5$—C$_2$H$_4$—)

acetyl, benzoyl, methylcarbamyl [CH$_3$NHC(O)—], ethylcarbamyl [C$_2$H$_5$NHC(O)—], propyl- and butylcarbamyl groups, phenylcarbamyl [C$_6$H$_5$NHC(O)—], tolylcarbamyl [(CH$_3$)$_2$C$_6$H$_3$NHC(O)—], benzylcarbamyl

[C$_6$H$_5$CH$_2$NHC(O)—]

and the like.

It is to be understood that the terminal organic radical (WO—) of the respective polyether groups of the polymers of this invention may be the same throughout the polymer or may differ as between monomeric units. Likewise, the WO— radical may also be the same or different within any particular unit containing more than one polyether group such as the difunctional siloxy units (B) of the E$_2$SiO$_{2/2}$ type (encompassed by Formula B-1 above), or the monofunctional siloxy units (C) of the E'$_2$R'SiO$_{1/2}$ or E'$_3$SiO$_{1/2}$ type (defined with reference to Formula C-1 above). For example, the polymer compositions of this invention can contain polyether groups in which the terminal group (WO—) is benzyloxy (C$_6$H$_5$CH$_2$O—) and other polyether groups in which WO— is a hydrocarbylcarbamate group such as methylcarbamate,

CH$_3$NHC(O)O—

When the polyfunctional siloxy units (B) of the polymers of this invention are difunctional, preferably one polyether group is bonded to silicon and the remaining valence of silicon is bonded to a monovalent hydrocarbon group, designated hereinabove as R. Thus, when in Formula B-3, for example, e is 1 and f is also 1, the difunctional units have the preferred structure:

$$\text{WO}—(\text{C}_n\text{H}_{2n}\text{O})_d—\text{L}—\underset{\underset{\text{R}}{|}}{\text{Si}}\text{O}_{2/2} \qquad \text{(B-4)}$$

wherein W, —(C$_n$H$_{2n}$O)$_d$— and L are as defined with specific reference to Formula B-3. As also described above, monovalent hydrocarbon groups, designated as R', can also be bonded to the silicon atom of the monofunctional siloxy units (C) as defined by general Formula C-1 above (that is, when h of Formula C-1 has a value of 1, 2 or 3). The monovalent hydrocarbon groups represented by R and R' are free of aliphatic unsaturation and contain from 1 to 12 carbon atoms, and can be any of the following: an alkyl group including linear and branched chain alkyl groups encompassed by the formula, C$_y$H$_{2y+1}$—, wherein y is an integer from 1 to 12; a cycloaliphatic radical including monocyclic and bicyclic groups; an aromatically unsaturated group including aryl, alkaryl and aralkyl radicals; and other combinations of the aforesaid groups such as alkyl- and aryl-substituted cycloaliphatic radicals; and the like.

Typical of the aforesaid respective classes of R and R' groups are: methyl, ethyl, n-propyl, isopropyl, n-butyl, t-butyl, octyl and decyl groups; cyclopentyl, cyclohexyl and bicyclo[2.2.1]-heptyl groups; phenyl and naphthyl groups; xylyl, tolyl, cumenyl, mesityl and t-butylphenyl groups; benzyl, beta-phenylethyl, and 2-phenylpropyl groups; methylcyclopentyl and phenylcyclohexyl; and the like.

Of the alkyl groups represented by R and R', the lower alkyl groups having from 1 to 4 carbon atoms are preferred of which methyl is especially suitable. It is to be understood that within any one of the monofunctional hydrocarbylsiloxy units of the polymers of this invention, the R' groups may be the same or different and that, as between monofunctional units, the R' groups may also be the same or different. Similarly, as between the preferred difunctional siloxy units, (E)(R)SiO$_{2/2}$—, of the polymers of this invention, the respective R groups may be the same or different and may or may not be the same as the R' groups of the monofunctional units. In the most preferred polymers of this invention, the monofunctional siloxy units (C) are of the R'$_3$SiO$_{1/2}$— type, the difunctional units are of the (E)(R)SiO$_{2/2}$ type, and essentially all of the R' and R groups bonded to the silicon atoms are methyl groups.

The novel organosilicone polymers of this invention are depicted by the general expression, $$[A]_a[B]_b[C]_c \qquad (D)$$

in which the reoccurring monomeric units A are SiO$_{4/2}$, and the reoccurring monomeric units B and C, are as described above with specific reference to Formulas B and C-1. When these respective definitions of the A, B and C units are included in the above expression, the polymeric compositions of this invention are expressed as follows:

$$[\text{SiO}_{4/2}]_a \left[ \text{E}_e—\underset{\underset{\text{R}_f}{|}}{\text{Si}}\text{O}_{\frac{4-(e+f)}{2}} \right]_b \left[ \text{E}'_g—\underset{\underset{\text{R}'_h}{|}}{\text{Si}}\text{O}_{\frac{4-(g+h)}{2}} \right]_c \qquad (\text{D-1})$$

wherein E and E' are polyether groups having the formula, WO—(C$_n$H$_{2n}$O)$_d$—L—, in which WO— is an organic terminal group of the poly(oxyalkylene) chain —(C$_n$H$_{2n}$O)$_d$—, and —L— is a bivalent hydrocarbon radical that links the chain to silicon, as defined above with particular reference to Formulas B-3 and C-2; and, as also previously defined, R and R' are monovalent hydrocarbon groups, e is from 1 to 2 and f is from 0 to 1, provided the sum e+f is from 1 to 2, and each of g and h can be 0 to 3, provided the sum g+h is 3; and the relative proportions of monomeric units A, B and C, expressed on a mole basis, are defined by the relative values of $a$, $b$ and $c$, respectively. The polymers of this invention contain from about 0.4 to about 2 moles of A per mole of B, and from about 0.2 to about 2 moles of C per mole of B. Therefore, in the above expressions D and D-1, the ratio of $a:b$ is from about 0.4:1 to about 2:1, and the ratio of $c:b$ is from about 0.2:1 to about 2:1.

The polymers of this invention have a total polyether content of from about 50 to about 85 weight percent and a corresponding total siloxane content of from about 50 to about 15 weight percent, the said polyether and siloxane contents being based on the combined total weight of the monomeric units A, B and C. As used herein, the expression "total polyether content" denotes the sum of the combined total weights of: (1) the polyether groups (E) that are bonded to silicon of the polyfunctional siloxy units (B), and (2) the polyether groups (E') when such groups are present in the monofunctional triorganosiloxy units (C). Accordingly, the expression "total siloxane content" denotes the sum of the combined total weights of: (1) the $SiO_{4/2}$ units, (a) the polyfunctional B units less the total weight of the polyether groups (E), and (3) the monofunctional units less the total weight of the polyether groups (E') which may be present therein.

The organosilicone polymers of this invention can contain the tetrafunctional A units in combination with one or more of the various types of B and C units encompassed by the above Formulas B and C-1, respectively. Illustrative of such combinations are the following:

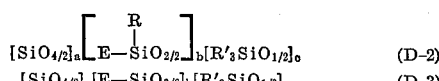  (D-2)

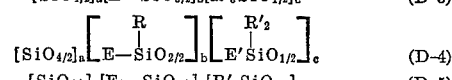  (D-3)

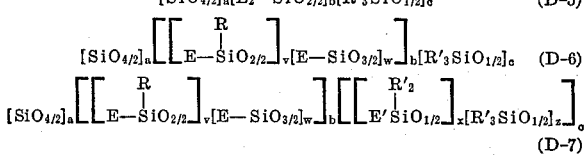  (D-4)

$[SiO_{4/2}]_a[E_2—SiO_{2/2}]_b[R'_3SiO_{1/2}]_c$  (D-5)

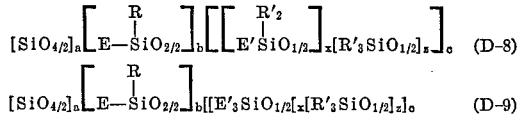  (D-6)

(D-7)

(D-8)

(D-9)

wherein E, E', R and R' have the aforesaid significance; $v$, $w$, $x$ and $z$ are positive numbers, the sum $v+w$ being equal to $b$ and the sub $x+z$ being equal to $c$; the mole ratio of the $SiO_{4/2}$ units to total polyether-substituted polyfunctional units to total monofunctional units (that is, the mole ratio of the [A]:[B]:[C] units, respectively) is defined by $a:b:c$ in which latter ratio the values of $a$, $b$ and $c$ are as aforesaid (that is, $a$ is from about 0.4 to about 2, $b$ is 1, and $c$ is from about 0.2 to about 2); and the total polyether content is maintained within the aforesaid range of from about 50 to about 85 weight percent, based on the combined total weight of the monomeric units.

The polymers of this invention are generally useful as surfactants and include compositions which find particular application in the manufacture of polyester urethane foam, inclding flame-retarded foam. Of the novel polymeric surfactants described herein, a generally preferred class, particularly for use in the formation of flexible polyester urethane foam, are the polymers represented by the following expression:

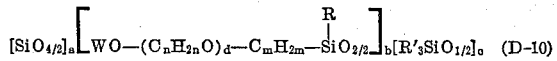  (D-10)

wherein R and R' are preferably lower alkyl radicals having 1 to 4 carbon atoms, the link between the organic-terminated poly(oxyalkylene) chain and silicon is provided by the bivalent alkylene radical, —$C_mH_{2m}$— ($m$ preferably being from 2 to 4); from 75 to about 100 weight percent of the poly(oxyalkylene) chain is attributable to oxyethylene units and from 25 to 0 weight percent is constituted of oxypropylene units; $d$ has a preferred average value of from about 5 to about 15; and the mole ratio of the tetra- to di- to mono-functional monomeric units is as aforesaid (that is, $a:b:c$ is about 0.4–2:1:0.2–2).

From the standpoint of providing greater operating latitude (that is, less dependency of foam quality, for example, on variables such as the concentration of surfactant in the foam-producing reaction mixture), it is generally preferred that the polymer contain from about 0.6 to about 1.8 moles of $SiO_{4/2}$ units (A) per mole of polyfunctional siloxy units (B), from about 0.8 to about 1.8 moles of monofunctional siloxy units (C) per mole of mole of polyfunctional siloxy units (B), and less than 3, and most preferably not more than 2.8, total moles of $A+C$ units per mole of B units. Thus, in the preferred $a:b:c$ ratio, $a$ is from about 0.6 to about 1.8, $b$ is 1, and $c$ is from about 0.8 to about 1.8, and most preferably, $a+c:b$ is from 1.4:1 to 2.8:1.

From the standpoint of having a superior over all combination of properties for the stabilization of flexible polyester foam, the most preferred polymers of this invention are as follows:

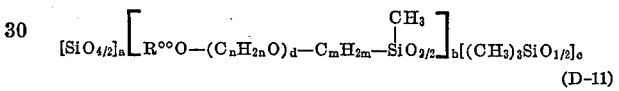  (D-11)

wherein $d$ has an average value of from about 5 to about 15; $m$ has a value of from 2 to 4; $a:b:c$ has the aforesaid preferred value of 0.6–1.8:1:0.8–1.8, provided $a+c:b$ is 1.4–2.8:1; and $R^{\circ\circ}$ is phenyl, lower alkyl, lower alkaryl or aryl-substituted lower alkyl groups. Particularly effective for the stabilization of flame-retarded flexible polyester urethane foams, are polymers in which at least a major proportion of the poly(oxyalkylene) chains are terminated by $R^{\circ\circ}O$— groups where the organic cap ($R^{\circ\circ}$) is benzyl.

In the preparation of the organosilicone polymers of this invention, silicon-containing reactants, designated herein as reactants A', B' and C', are employed in which silicon is bonded directly to hydrolyzable groups the number of which corresponds to the number of oxygen atoms bonded to silicon of the respective monomeric units A, B and C. The hydrolyzable groups can be halogen, radicals bonded to silicon through an oxygen atom, and any combination thereof. Illustrative of suitable reactants (A') from which the tetrafunctional monomeric units (A) are derived are those encompassed by the general formula:

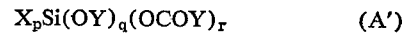  (A')

wherein X is halogen (usually chlorine or bromine), Y is a hydrocarbon radical such as alkyl, aryl and aralkyl, and the like, and $p$, $q$ and $r$ can each have a value of zero to 4, provided the sum $p+q+r$ is four. Typical examples of this reactant are silicon tetrachloride, lower alkyl orthosilicates having the formula, $Si(OY')_q$, wherein $q$ is 4, and the partial lower alkyl esters of silicon tetrachloride, $(Cl)_pSi(OCOY')_r$, wherein each of $p$ and $r$ has a value of from 1 to 3, provided $p+r$ is 4, and Y' in each instance is an alkyl group having from 1 to 4 carbon atoms. Tetraethoxysilane (also known as tetraethyl orthosilicate or simply as ethyl orthosilicate) is especially suitable as the A' reactant.

Reactant B' which is the ultimate source of the polyether-substituted polyfunctional monomeric B units contains from 2 to 3 hydrolyzable groups bonded to silicon depending upon whether it is desired to provide difunctional or trifunctional units in the polymer. Suitable as the B' reactants are compounds encompassed by the general formula:

$$E°_e-\underset{R_f}{\underset{|}{Si}}-(X)_s(OY)_t(OCOY)_u \qquad (B')$$

wherein R corresponds to the monovalent hydrocarbon group (R) of the polyfunctional B units encompassed by general Formula B above; E° is either hydrogen or the polyether group (E) of general Formula B above, having the more specific structure, WO—$(C_nH_{2n}O)_d$—L—, wherein the bivalent linking group (—L—) is preferably an alkylene group, —$C_mH_{2m}$—, as defined above with reference to Formula B–3; e and f also have the same significance as in the monomeric polyfunctional B units (that is, e is from 1 to 2, f is from 0 to 1, and the sum e+f is 1 to 2); X and Y are as above-defined with respect to reactant A', and each of s, t and u can be 0 to 3, provided the sum s+t+u is from 2 to 3, and the sum e+f+s+t+u is 4.

Illustrative of the various types of reactants encompassed by Formula B' are the following:

$$WO-(C_nH_{2n}O)_d-C_mH_{2m}-\underset{|}{\overset{R}{\underset{|}{Si}}}-X_2 \qquad (B'-1)$$

$$H-\underset{|}{\overset{R}{\underset{|}{Si}}}X_2 \qquad (B'-2)$$

$$WO-(C_nH_{2n}O)_d-C_mH_{2m}-\underset{X}{\overset{R}{\underset{|}{Si}}}-OY \qquad (B'-3)$$

$$WO-(C_nH_{2n}O)_d-C_mH_{2m}-\underset{X}{\overset{R}{\underset{|}{Si}}}-O\overset{O}{\overset{\|}{C}}Y \qquad (B'-4)$$

[WO—$(C_nH_{2n}O)_d$—$C_mH_{2m}$—]$_2$SiX$_2$ (B'–5)
H$_2$SiX$_2$ (B'–6)
OW—$(C_nH_{2n})O_d$—$C_mH_{2m}$—SiX$_3$ (B'–7)
HSiX$_3$ (B'–8)

wherein R and the preferred organic capped polyether group, WO—$(C_nH_{2n}O)_d$—$C_mH_{2m}$—, are as above-defined with specific reference to Formula B–3 of polyfunctional monomeric units B, X is halogen (usually chlorine) and Y is usually a lower alkyl group (Y') such as methyl or ethyl. In the preparation of organosilicone polymers of this invention in which a combination of different polyfunctional siloxy units B are present such as the $$(E)(R)SiO_{2/2}$$

and E—SiO$_{3/2}$ units, more than one B' reactant is required. For example, in preparing the polymers illustrated above as D–6 and D–7, the respective di- and tri-functional siloxy units are obtained by employing a combination of corresponding B' reactants such as the aforesaid reactants B'–1 and B'–7. Alternatively, such polymers are provided by employing a combination of hydrosilanes such as reactants B'–2 and B'–8, as the source of the siloxane portions of the respective B units, and the silicon-bonded hydrogen is subsequently replaced by the polyether groups (E), as described hereinbelow. It is to be understood that a combination of polyether-substituted and hydrogen-substituted reactants such as B'–1 and B'–8 can also be employed without departing from the scope of this invention.

Reactant C' which is the ultimate source of the monofunctional triorganosiloxy units (C) of the polymers of this invention, contains one hydrolyzable group and is represented by the following general formula:

$$E''_g-\underset{|}{\overset{R'_h}{\underset{|}{Si}}}-Z \qquad (C')$$

wherein R' corresponds to the monovalent hydrocarbon group (R') of the monofunctional C units encompassed by Formula C–1 above; E'' is either hydrogen or the polyether group (E') of Formula C–1 above, having the more specific structure, WO—$(C_nH_{2n}O)_d$—L—, wherein the bivalent linking group (—L—) is preferably an alkylene group (—$C_mH_{2m}$—) as above defined with specific reference to Formula C–2; g and h also have the same significance as in the monofuctional monomeric C units (that is, each of g and h can be from 0 to 3, provided their sum is 3); Z can be any of the aforesaid hydrolyzable groups, designated as X, —OY and —OC(O)Y, and can additionally be a hydroxyl group or, when g is zero, Z can also be an —OSiR'$_3$ group in which event the C' reactant is a disiloxane.

Illustrative of the various types of reactants encompassed by Formula C' are the following:

| | |
|---|---|
| R'$_3$SiX | (C'–1) |
| R'$_3$SiOH | (C'–2) |
| R'$_3$Si—OY | (C'–3) |
| R'$_3$Si—OC(O)Y | (C'–4) |

$$WO-(C_nH_{2n}O)_dC_mH_{2m}-\underset{R'}{\overset{R'}{\underset{|}{Si}}}-X \qquad (C'-5)$$

$$[WO-(C_nH_{2n}O)_dC_mH_{2m}-]_2\underset{R'}{\overset{R'}{\underset{|}{Si}}}-X \qquad (C'-6)$$

$$H-\underset{R'}{\overset{R'}{\underset{|}{Si}}}-X \qquad (C'-7)$$

$$R'_3SiOSiR'_3 \qquad (C'-8)$$

wherein R' and the preferred organic capped polyether group, WO—$(C_nH_{2n}O)_d$—$C_mH_{2m}$—, are as defined with specific reference to Formula C–2 above of the monofunctional C units; X is halogen (usually chlorine) and Y is usually a lower alkyl group (Y') such as methyl or ethyl. In preparing organosilicone polymers of this invention in which a combination of different monofunctional siloxy units are present, such as the R'$_3$SiO$_{1/2}$ and $$(R')_2(E')SiO_{1/2}$$

units, more than one C' reactant is required. For example, in preparing the polymers illustrated above as D–7 and D–8, the respective monofunctional units are obtained by employing a combination of corresponding C' reactants such as the aforesaid reactants C'–1 and C'–5, or the aforesaid reactants C'–1 and C'–7. When employing a hydrosilane such as reactant C'–7, the silicon-bonded hydrogen is subsequently replaced by the polyether group (E'), as described hereinbelow.

The organosilicone polymers of this invention are produced by the process which comprises cohydrolyzing the above-described reactants A', B' and C' and cocondensing the hydrolyzate, thereby providing either the polymer composition of the invention as the direct product of the cohydrolysis-cocondensation reaction, or an intermediate siloxane polymer product containing silicon-bonded hydrogen which is reacted further to substitute silanic hydrogen with polyether groups. Reactants A', B' and C' are employed in respective amounts selected to provide the corresponding monomeric A, B and C units in the relative molar proportions defined above as the a:b:c ratio in which ratio the values of a and c are from about 0.4 to about 2 and from about 0.2 to about 2, respectively, expressed on the normalized basis of b=1. Accordingly, in producing the polymers of this invention, from about 0.4 to about 2 moles of A' are employed per mole of B' and from about 0.2 to about 2 moles of C' are employed per mole of B'. Water is preferably used in an amount at least sufficient to satisfy the stoichiometry of the cohydrolysis reaction. Usually, water is used in a 10 to 200 percent molar excess of the stoichiometric requirements, although more than a 200 percent molar excess can be employed without departing from the scope of this embodiment of the present invention.

The cohydrolysis-cocondensation reaction for producing the novel polymers described herein is illustrated by the following Equation 1 wherein for convenience, tetraethoxysilane is shown as reactant A', and chlorine is shown as the hydrolyzable groups of reactants B' and C':

(Equation 1)

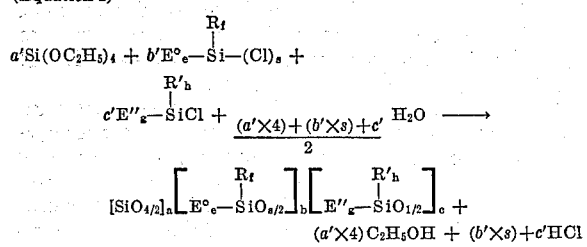

wherein, as above-defined, E° is either hydrogen or a polyether group (E); E'' is either hydrogen or a polyether group (E'); R and R' are monovalent hydrocarbon groups; $e$ is from 1 to 2 and $f$ is from 0 to 1, provided $e+f$ is from 1 to 2; $s$ is from 2 to 3, provided $e+f+s$ is 4; each of $g$ and $h$ can be 0 to 3, provided $g+h$ is 3; $a'$, $b'$ and $c'$ which represent the number of moles of the indicated A', B' and C' reactants, can be any positive numbers provided the ratio thereof, that is, $a':b':c'$, when expressed on the normalized basis of $b'=1$, is about 0.4–2:2:1:0.2–2, thereby providing polymers in which the respective monomeric units A, B and C are present in corresponding molar proportions, the $a:b:c$ ratio also being about 0.4–2:1:0.2–1. Provided the ratio of the number of moles of reactants employed is as specified, the actual number of moles employed (and thus the quantity of polymer produced) can be any multiple of the $a':b':c'$ ratio, depending upon the scale on which it is desired to carry out the reaction.

When the B' reactant employed in the cohydrolysis-cocondensation reaction of Equation 1 is a hydrosilane (such as, for example, reactants B'–2, B'–6 and B'–8 above), the product thereof is reacted further with a monoolefinic poly(oxyalkylene) ether having the formula WO—$(C_nH_{2n}O)_d$—$C_mH_{2m-1}$. In the ether reactant, the moiety, WO—$(C_nH_{2n}O)_d$—, is as above-defined with respect to the corresponding organic terminated poly(oxyalkylene) chain of the polyether substituted polyfunctional siloxy units (B), and —$C_mH_{2m-1}$ is a monovalent olefinic group wherein $m$ has the same significance as in the bivalent alkylene group (—$C_mH_{2m}$—) of the polyether substituents (E) of monomeric units B (that is, $m$ has a value of from 2 to 14, and is usually from 2 to 4). This embodiment of the method for producing the novel polymers of the present invention is illustrated by the reactions of the following Equations 2 and 3 wherein tetraethoxysilane and a trihydrocarbyl monochlorosilane typically illustrate the A' and C' reactants, respectively, the B' reactant is shown as a hydrocarbyl-substituted dichlorohydrosilane, and, for the purpose of illustration, the A', B' and C' reactants are used in equimolar proportions:

(Equation 2)

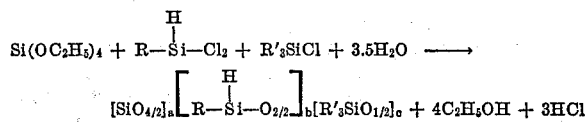

(Equation 3)

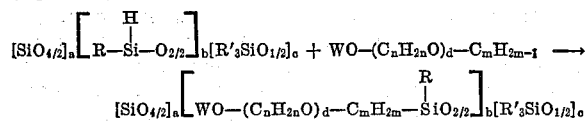

Since the reaction of Equation 2 is illustrated on the basis of equimolar amounts of reactants A', B' and C', the mole ratio of $a:b:c$ in Equations 2 and 3 is, of course, 1:1:1. When the C' reactant contains silanic hydrogen, the product of the cohydrolysis-cocondensation reaction is reacted in a similar manner with the aforesaid monoolefinic ether reactant to provide monomeric C units containing a polyether substituent (E'). Further, when reacant B' (or C')

ether substituent (E'). Further, when reactant B' (or C') in reactant B'–6 above, for example, the intermediate product of the reaction of Equation 2, is reacted with a corresponding number of moles of the monoolefinic polyether reactant.

In accordance with another embodiment of the process for preparing the novel organosilicone polymers of this invention, the B' reactant is one in which E° of the above Formula B' is a polyether group (E) rather than hydrogen, and the polymers are produced as the direct product of the cohydrolysis-cocondensation reaction. This embodiment is illustrated by the reaction of the following Equation 4 wherein tetraethoxysilane typically illustrates the A' reactant, B' is shown as a mono(polyether)-substituted hydrocarbyldichlorosilane, C' is illustrated as a trihydrocarbylchlorosilane, and reactants A', B' and C' are employed in equimolar amounts:

(Equation 4)

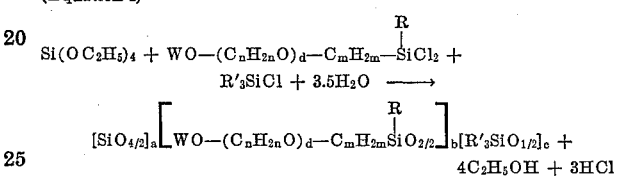

wherein R, R', WO, $n$, $d$ and $m$ are as previously defined herein and the mole ratio ($a:b:c$) of the respective monomeric units is 1:1:1. In providing polymers of this invention in which the monomeric B units are trifunctional (that is, E—$SiO_{3/2}$), the reaction of Equation 4 is carried out employing a mono(polyether)-substituted silane containing three hydrolyzable groups as the B' reactant such as, for example, the trichlorosilane having the formula, WO—$(C_nH_{2n}O)_d$—$C_mH_{2m}$—$SiCl_3$. Further, in producing polymers of this invention containing one or more of the polyether-substituted monofunctional C units of the type, (E') (R')$_2$SiO$_{1/2}$, (E')$_2$(R')SiO$_{1/2}$ or (E')$_3$SiO$_{1/2}$, the cohydrolysis-cocondensation reaction of Equation 4 is effected using the respective mono-, di- or tri-(polyether)-substituted monochlorosilanes encompassed by Formula C' in place of, or in addition to, the R'$_3$SiCl reactant shown in Equation 4.

Reactants B' encompassed by Formula B' above in which one or two polyether groups (E) are bonded to silicon, and reactants C' encompassed by Formula C' containing from one to three polyether group (E'), are prepared by reacting the aforesaid monoolefinic poly(oxyalkylene) ethers, WO—$(C_nH_{2n}O)_d$—$C_mH_{2m-1}$, with hydrosilanes in which the number of silicon-bonded hydrogen atoms corresponds to the number of polyether groups desired in the monomeric B or C units. For example, the B' reactant shown in Equation 4 above, is prepared in accordance with the following Equation 5 and reactants C' of the (E')(R')$_2$SiCl and (E')$_2$(R')SiCl type, are prepared as illustrated by Equations 6 and 7 below.

(Equation 5)

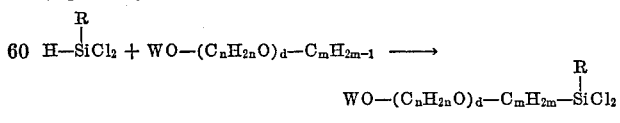

(Equation 6)

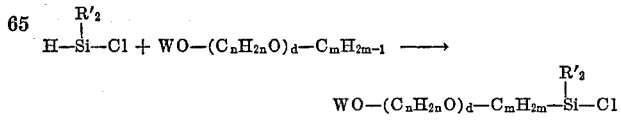

(Equation 7)

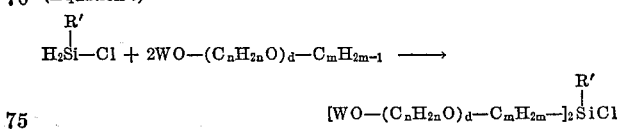

wherein R, R', WO, $n$, $d$, and $m$ have the previously defined significance, and the monoolefinic group, $$-C_mH_{2m-1},$$

is preferably vinyl, allyl or methallyl, the allyl group being especially suitable. The monoolefinic polyether reactants used in the reactions of Equations 3 and 5-7 above, can be prepared by starting alkylene oxide polymerization with a monoolefinic alcohol such as allyl alcohol to provide HO—$(C_nH_{2n}O)_d$—$C_mH_{2m-1}$ (wherein $n$ and $d$ are as previously defined herein and $m$ has a value of at least 3), followed by capping of the terminal hydroxyl group with the aforesaid organic radical, W—, such as methyl, phenyl, benzyl, acetyl, methylcarbamyl and like capping groups. Further details concerning the method of preparation of such polyether reactants are disclosed in pending U.S. application Ser. No. 109,587, filed Jan. 25, 1971, of E. L. Morehouse, now abandoned. Alternatively, the polyether reactants can be prepared by starting the alkylene oxide polymerization with an alkanol such as methanol, an aralkyl alcohol such as benzyl alcohol, a phenol and the like, followed by capping of the terminal hydroxyl group of the reaction product with the monoolefinic group such as vinyl, allyl, methallyl and the like. Of these various polyether reactants, allyl alcohol-started poly(oxyalkylene) ethers are especially suitable.

The addition of the silanic hydrogen of the respective silane reactants of Equations 5-7, as well as the addition of the silicon-bonded hydrogen of the intermediate polymer product shown by the reaction of Equation 3, to the monoolefinic group, —$C_mH_{2m-1}$ (e.g., —$CH_2$—$CH=CH_2$), of the polyester reactants, is platinum-catalyzed. Usually, platinum is used in the form of chloroplatinic acid in a catalytic amount such as from 5 to 150, preferably from 10 to 50, parts per million parts by weight of the silicon-containing and polyether reactants. Suitable reaction temperatures range from about room temperature (25° C.) to about 150° C. If desired, the addition reaction may be conducted in the presence of liquid aromatic hydrocarbons such as toluene and xylene, although other non reactive solvents can be used.

When the organic radical (W—) of the terminal group (WO—) of the poly(oxyalkylene) chain of the di- or tri-functional monomeric units (B) is a monovalent hydrocarbon group (that is, the above-defined R°°-group) such as methyl, phenyl and benzyl groups, the novel polymers described herein are preferably prepared in accordance with the method illustrated by the reaction of equation (4) above, in which the B' reactant already contains the polyether group (E) and the polymer is the direct product of the cohydrolysis-cocondensation reaction. Likewise, polymers in which the monofunctional siloxy units (C) contain polyether groups (E') capped by a monovalent hydrocarbon radical (R°°—), are also preferably prepared as the direct product of the cohydrolysis-cocondensation reaction. When the organic cap (W—) of the polyether group of the B units (or C units) is an acyl (R°°CO—) or carbamyl (R°°NHCO—) group, it is usually preferred to prepare the polymers of this invention in accordance with the reactions of Equations 2 and 3 whereby, as shown, the polyether groups (E and, when present, E') are introduced in a step subsequent to the cohydrolysis-cocondensation reaction.

The above-described cohydrolysis-cocondensation reactions for producing the organosilicone polymers of this invention can be carried out at temperatures from about 25° C. to about 150° C., in the presence or absence of a solvent or diluent. The presence of solvents may aid by increasing compatibility between reactants, effecting distribution, and thereby avoiding gel formation and controlling reaction rates. Useful solvents are aromatic hydrocarbons (such as, for example, toluene and xylene), mixtures of aromatic hydrocarbons, low molecular weight alcohols (such as, for example, isopropanol), ethers including low molecular weight polyethers in which hydroxyl groups initially terminating the chains have been capped with an organic group (such as, for example, methyl) and other solvents which are non reactive with silicon-bonded functional groups (such as Si—H, Si—Cl and Si—OY) of the A', B' and C' reactants.

The by-products of the cohydrolysis-cocondensation reaction depend, of course, on the nature of the hydrolyzable groups of the A', B' and C' reactants, and are readily removed from the polymeric product, usually by fractional distillation. For example, the ethanol and hydrochloric acid formed as by-products of the illustrative reactions of Equations 1, 2 and 4 above, are readily removed, together with excess water, as a $$C_2H_5OH—HCl—H_2O$$

azeotrope. As desired, any organic solvent used in the polymer preparation is also removed by conventional separation techniques to obtain a substantially 100 percent active polymer composition. After removal of by-products and water a substantially neutral product of the cohydrolysis-cocondensation reaction is provided. Although neutralization is usually not necessary, sodium bicarbonate may be added and the polymer product filtered to remove platinum residues introduced during the platinum-catalyzed preparation of the polyether-substituted B' and C' reactants, as illustrated by Equations 5-7 above, or during the platinum-catalyzed reaction of the intermediate polymeric product containing silanic hydrogen with the above-described monoolefinic polyether reactants, as illustrated by Equation 3 above.

In addition to the monomeric A, B and C units, the polymers of this invention may contain residual silanols and residual hydrolyzable groups remaining from the reactants employed in the preparation thereof. In addition, a small percentage (on the average, usually about 10 mole percent or less) of the total polyether groups (E and, when present, E') may be residual, uncapped hydroxyl-terminated groups

[that is, HO—$(C_nH_{2n}O)_d$—$C_mH_{2m}$—], introduced with the monoolefinic poly(oxyalkylene) ether reactants employed in the reaction of Equation 3 above, or in the preparation of the B' (or C') reactants as illustrated by the above Equations 5-7. In the use of the polymers of this invention as stabilizers of polyester foam, the total weight of the aforesaid residual groups should be no higher than about 10 weight percent, and is preferably less than 6 weight percent, based on the total weight of the polymer.

The content of such residual groups is substantially reduced and minimized by treatment of the polymeric products with an organic isocyanate in the presence of an amine catalyst such as those described hereinbelow as suitable for the urethane-forming reaction (for example, triethylamine and N-ethylmorpholine), or a metal catalyst such as organo-tin compounds (for example, stannous octoate, dibutyltin laurate, and the like). Usually, the organic isocyanate employed in this treatment is an alkyl, aryl or aralkyl mono-isocyanate, such as methyl, ethyl, phenyl, benzyl isocyanates, and the like. The treatment of the polymer product in this manner may be carried out in the presence or absence of a solvent or diluent. Aromatic hydrocarbons such as xylene and toluene are suitable as the solvent medium.

The polymer compositions of this invention are liquids and have molecular weights which vary over a relatively wide range. Generally, the average molecular weights of the polymers of this invention range from about 1000 to about 20,000 (as measured by Gel Permeation Chromatography using a calibration curve based on dimethylsiloxane fluids).

The organosilicone polymers of this invention are mixtures of polymer species which differ in molecular weight, polyether and siloxane contents, and relative molar proportions of the monomeric units. It is to be understood, therefore, that as expressed herein, the values of these parameters are average values.

The organosilicone polymers of this invention are effective as stabilizers of flexible polyester urethane foams and can, therefore, be used as such without the need for combination with an anionic or cationic organic surfactant, or other type of organic additive. The polymers can be employed as a 100 percent active stream, or they can be employed in dilute form as a solution in polar solvents (e.g., glycols) or non polar organic solvents such as normally liquid aliphatic and aromatic unsubstituted and halogen-substituted hydrocarbons (e.g., heptane, xylene, toluene, chlorobenzenes and the like). In addition to the polymers, the other essential types of components and reactants employed in the production of flexible polyester urethane foam in accordance with the process of this invention are polyester polyols, organic polyisocyanates, amine catalyst and blowing agent. When producing self-extinguishing foams, the foam-producing reaction mixture also contains a flame retardant. The organosilicone polymers of this invention are usually present in the final foam-producing reaction mixture in amounts of from about 0.15 to about 4.0 parts by weight per 100 parts by weight of the polyester polyol reactant.

It is often the preferred practice of foam manufacturers to premix the foam stabilizer, amine catalyst and water (which is the usual source of at least part of the blowing action), and to feed the aqueous premixture to the foam-producing reaction mixture as a single stream. The mere mixing of the organosilicone polymers of this invention with the catalyst and water, however, forms a heterogeneous mixture which detracts from the processing advantage of adding these components as a combined stream rather than as individual streams. The problem of premix incompatibility is overcome in accordance with the present invention by providing homogeneous aqueous premixtures comprising the organosilicone polymer, amine catalyst, an organic acidic component and, as an additional ingredient, either a water soluble organic surfactant or a water soluble glycol, or both of the latter two types of components. Although these various organic additives can be introduced directly to the aqueous premixture of foam stabilizer and catalyst, the formation of clear, homogeneous aqueous solutions is facilitated by blending the additives with the foam stabilizer (that is, the organosilicone polymers of this invention) and combining the resulting blend with water and the amine catalyst system. In accordance with another embodiment of this invention, therefore, solution compositions are provided comprising the organosilicone polymers of this invention, the aforesaid organic acidic component, and one or both of an organic surfactant and glycol. The organosilicone polymer is present in the solution compositions in an amount of from about 10 to about 80 parts by weight per 100 parts by weight of the solution.

The aforesaid organic acidic component comprises the saturated and unsaturated aliphatic and cycloaliphatic carboxylic acids containing from 15 to 20 carbon atoms. Illustrative of suitable acidic components are the fatty acids such as, for example, palmitic, stearic, palmit-oleic, oleic, linoleic, linolenic and ricinoleic acids; resin acids of the abietic and pimaric type; and any combination of the aforesaid acids as well as industrial by-products and naturally-occurring materials comprising such acids. An especially suitable acidic component of the solution compositions and aqueous premixtures of this invention is tall oil which is a by-product of sulfate digestion of wood pulp and is composed largely of fatty acids (oleic, linoleic, linolenic and palmitic acids) and resin acids, and a minor amount of neutral material such as fatty acid esters.

The above-described organic acidic component is present in the solution compositions of this invention in an amount of from about 5 to about 90 parts by weight per 100 parts by weight of organosilicone polymer present in the solution.

The water-soluble organic surfactant which can be a component of the solution compositions of this invention may be of the non ionic, anionic, cationic or amphoteric types, including combinations thereof. Preferably, the organic surfactant is a non ionic surfactant such as: the poly(oxyalkylene) ethers of the higher alcohols having from 10 to 18 carbon atoms including mixtures thereof; polyoxyalkylene ethers of alkyl-substituted phenols in which the alkyl group can have from 6 to 15 carbon atoms; and corresponding polythioalkylene adducts of the aforesaid higher alcohols and phenols. The length of the ether chain is such that appropriate hydrophilic character is provided to balance the hydrophobic portion derived from the alcohol or phenol and render the compound soluble in water. The chain may contain oxyethylene units either as essentially the sole type of unit or oxyethylene in combination with a minor amount of oxypropylene. It is preferred that the hydrophilic portion of the non ionic surfactants be composed essentially of oxyethylene monomeric units. Usually the average number of such $—OC_2H_4—$ units ranges from about 4 to about 20, although upwards of 40 such units can also be present.

Typical examples of non ionic surfactants which can be used as components of the solution compositions of this invention are the adducts produced by reaction of $k$ moles of ethylene oxide (wherein $k$ has a value of from about 4 to about 40, inclusive of whole and fractional numbers) per mole of any of the following hydrophobes including mixtures thereof: n-undecyl alcohol, myristyl alcohol, lauryl alcohol, trimethyl nonanol, tridecyl alcohol, pentadecyl alcohol, cetyl alcohol, oleyl alcohol, stearyl alcohol, nonylphenol, dodecylphenol, tetradecylphenol, and the like.

Other illustrative water soluble organic surfactants which can be present as a component of the solution compositions of this invention are: sodium, potassium, ammonium and quaternary ammonium salts of sulfonic acids wherein the hydrocarbyl portion can be alkyl or alkaryl groups containing from 10 to 20 carbon atoms. Examples of such organic surfactants are: sodium tetradecyl sulfonate and sodium dodecylbenzene sulfonate; sodium and potassium salts of sulfonated petroleum fractions such as mineral oil; diethylamine salts of sulfonated $C_{10}$–$C_{15}$ alkylated aromatic hydrocarbons; taurine compounds having at least one long chain hydrocarbyl group bonded to nitrogen; and the like.

The solution compositions of this invention may also contain, as a third type of organic component, a glycol of from 2 to about 10 carbon atoms, or low molecular weight Carbowax polyethylene glycols. Especially suitable is hexylene glycol (2-methyl-2,4-pentanediol).

When both the organic surfactant and glycol components are present in the solution compositions of this invention, the combined concentration thereof ranges from about 5 to about 90 parts by weight per 100 parts by weight of the organosilicone polymer contained therein. When only one of these components is present, the concentration thereof is also within this latter range.

When the aforesaid solution compositions of the organosilicone polymers of this invention are combined with water and amine catalyst such as the catalysts described hereinbelow, clear, homogeneous aqueous solutions are obtained which can be added directly to the foam-producing reaction mixture. From the standpoint of retaining these desirable characteristics of clarity and homogeneity under otherwise adverse ambient temperatures which may be encountered upon standing, storage or shipment prior to use in the foam-producing reaction, the preferred aqueous premixtures are those containing both the organic surfactant (of which non ionics are preferred) and the glycol, in addition to the organic acidic component. It is to be understood that the aforesaid solution compositions of the organosilicone polymers of this invention are also useful when added directly to the final foam-producing reaction mixture rather than being premixed with water and amine catalyst.

The solution compositions of the foam stabilizer as well as the aqueous premixtures of this invention, can contain minor amounts of other ingredients without departing from the scope of this invention. Such components include inhibitors such as for example, d-tartaric acid, tertiary-butyl pyrocatechol and di - tert - butyl - p - cresol ("Ionol"), which reduce any tendency of the foamed product to oxidative or hydrolytic instability. Further, when the foam stabilizers of this invention and/or the amine catalyst are employed as respective solutions, water soluble carrier solvents and components thereof are, of course, introduced into the aqueous premixtures without, however, any deleterious affect on the effectiveness or homogeneity of the aqueous solution premixtures.

The relative proportions of the organosilicone foam stabilizer of this invention, the amine catalyst and water in any particular solution are largely dependent upon and determined by the relative proportions of such ingredients which are desired in a particular foam-producing reaction mixture. Accordingly, in the preparation of a particular aqueous premixture of this invention, the relative proportions of the foam stabilizer, amine catalyst and water are adjusted and the aqueous premixture is added to the final foam-producing formulation in an amount sufficient to satisfy the respective functions of such components and to provide a foamed product of desired quality.

The polyester polyols employed in producing flexible foams in accordance with the process of this invention are the reaction products of polyfunctional organic carboxylic acids and polyhydric alcohols. The polyester polyols contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers from 30 to 150, and preferably have hydroxyl numbers from 45 to 65. These hydroxyl numbers are readily determined according to the procedure described by Mitchel et al., Organic Analysis, volume I (Interscience, New York 1953).

Typical of the polyfunctional organic carboxylic acids that can be employed in producing polyester polyols useful in this invention are: dicarboxylic aliphatic acids such as succinic, adipic, sebacic, azelaic, glutaric, pimelic, malonic and suberic acids; and diarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

The polyhydric alcohols (organic polyols) that can be employed in producing the polyester polyol starting material used in the process of this invention include the monomeric polyhydric alcohols such as, for example, glycerol; 1,2,6-hexanetriol; ethylene glycol; diethylene glycol; trimethylol propane; trimethyoletheane; pentaerythritol; propylene glycol; 1,2-, 1,3- and 1,4-butylene glycols; 1,5-pentanediol; sorbitol; and the like, including mixtures thereof.

Other polyhydric alcohols that can be employed in producing the polyester polyols useful in this invention are the polymeric polyhydric alcohols which include the linear and branched chain polyethers having a plurality of acyclic ether oxygens and at least two alcoholic hydroxyl radicals. Illustrative of such polyether polyols are the poly (oxyalkylene) polyols containing one or more chains of connected oxyalkylene radicals which are prepared by the reaction of one or more alkylene oxides with acyclic and alicyclic polyols. Examples of the poly(oxyalkylene) polyols include the poly(oxyethylene) glycols prepared by the addition of ethylene oxide to water, ethylene glycol or diethylene glycol; poly(oxypropylene) glycols prepared by the addition of propylene oxide to water, propylene glycol or dipropylene glycol; mixed oxyethylene-oxypropylene polyglycols prepared in a similar manner utilizing mixture of ethylene oxide and propylene oxide or a sequential addition of ethylene oxide and propylene oxide; and the poly(oxybutylene) glycols and copolymers such as poly(oxyethylene-oxybutylene) glycols and poly(oxypropylene-oxybutylene) glycols. Included in the term "poly(oxybutylene) glycols" are polymers of 1,2-butyleneoxide and 2,3-butyleneoxide.

Illustrative of further polyester polyol reactants that are useful in producing flexible polyester urethane foam in accordance with the process of this invention are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane; 1,2,6-hexanetriol; pentaerythritol; sorbitol; glycosides such as methyl, ethyl, propyl, butyl and 2-ethylhexyl arabinoside, xyloside, fructoside, glucoside, and rhammoside; surcrose; mononuclear polyhydroxybenzenes such as resorcinol, pyrogallol, phloroglucinol, hydroquinone, 4,6-di-tertiary-butylcatechol, and catechol; polynuclear hydroxybenzenes ("polynuclear" designating at least two benzene nuclei) such as the di-, tri- and tetraphenylol compounds in which two to four hydroxylbenzene groups are attached either directly by means of single bonds or through an aliphatic hydrocarbon radical containing one to twelve carbon atoms, such compounds being typically illustrated by 2,2-bis(p-hydroxyphenyl) - propane, bis(p - hydroxyphenyl)-methane and the various diphenols and diphenol methanes disclosed in U.S. Pat. Nos. 2,506,486 and 2,744,882, respectively. Another type of polyester polyol reactant is that produced by reaction of a polycarboxylic acid and the polyether adducts formed by reaction of ethylene oxide, propylene oxide or butylene oxide with phenol-formaldehyde condensation products such as the novolaks.

The organic polyisocyanates that are useful in producing flexible polyester urethane foam in accordance with the process of this invention are organic compounds that contain at least two isocyanato groups. Such compounds are well known in the art of producing polyurethane foams, and are conveniently represented by the general formula:

$$Q(NCO)_i$$

wherein $i$ is an integer of two or more and Q is an organic radical having the valence of $i$. Q can be a substituted or unsubstituted hydrocarbon group (e.g., alkylene, cycloalkylene, arylene, alkarylene, aralkylene and the like). Q can also be a group having the formula Q'—Z'—Q' wherein Q' is an alkylene or arylene group and Z' is a divalent moiety such as —O—, —O—Q'—O—, —C(O)—, —S—, —S—Q'—S—, or —SO₂—.

Illustrative of suitable organic polyisocyanate reactants are the following including mixtures thereof:

1,2-diisocyanato-ethane;
1,3-diisocyanato-propane;
1,4-diisocyanato-butane;
1,5-diisocyanato-pentane;
1,6-diisocyanato-hexane;
1,5-diisocyanato-2,2-dimethyl-pentane;
1,7-diisocyanato-heptane;
1,5-diisocyanato-2,2,4-trimethyl-pentane;
1,8-diisocyanato-octane;
1,9-diisocyanato-nonane;

1,10-diisocyanato-decane;
1,11-diisocyanato-undecane;
1,12-diisocyanato-dodecane;
1,6-diisocyanato-3-methoxy-hexane;
1,6-diisocyanato-3-butoxy-hexane;
bis(3-isocyanato-propyl)ether;
the bis(3-isocyanato-propyl)ether of 1,4-butylene glycol;
$(OCNCH_2CH_2CH_2OCH_2)_2O$;
bis(2-isocyanatoethyl) carbonate;
1-methyl-2,4-diisocyanato-cyclohexane;
1,8-diisocyanato-p-methane;
bis 5,6-(2-isocyanatoethyl)bicyclo[2.2.1]-hept-2-ene;
bis(3-isocyanato-propyl)sulfide;
bis(isocyanato-hexyl)sulfide;
1,4-phenylene-diisocyanate;
2,4-tolylene-diisocyanate;
2,6-tolylene-diisocyanate;
crude tolylene diisocyanates;
xylylene diisocyanates;
4,4'-diisocyanato-dibenzyl;
4-bromo-1,3-phenylene-diisocyanate;
4-nitro-(1,3 or 1,5)-phenylene-diisocyanate;
4-ethoxy-1,3-phenylene-disocyanate;
benzidine diisocyanate;
toluidine diisocyanate;
dianisidine diisocyanate;
2,4'- or 4,4'-diisocyanato-diphenyl ether;
diphenylmethane-4,4'-diisocyanate;
4,4'-diisocyanato-dibenzyl;
isopropyl-benzene-alpha-4-diisocyanate;
1,5-diisocyanato-naphthalene;
1,8-diisocyanato-naphthalene;
9,10-diisocyanato-anthracene;
triphenyl-methane-4,4',4''-triisocyanate;
2,4,6-toluene triisocyanate;

and many other organic polyisocyanates that are known in the art such as those disclosed in an article by Siefken, Ann., 565,75 (1949). In general, the aromatically unsaturated polyisocyanates are preferred.

Further included among the isocyanates useful in the process of this invention are dimers and trimers of isocyanates and diisocyanates and polymeric diisocyanates such as those having the general formula:

$$[Q(NCO)_i]_j$$

in which $i$ anl $j$ are integers of two or more, and/or (as additional components in the reaction mixtures) compounds of the general formula:

$$L'(NCO)_i$$

in which $i$ is one or more and L' is a monofunctional or polyfunctional atom or radical. Examples of this type include ethylphosphonic diisocyanate, $C_2H_5P(O)(NCO)_2$; phenylphosphonic diisocyanate, $C_6H_5P(O)(NCO)_2$; compounds containing an $\equiv$Si—NCO group, isocyanates derived from sulfonamides ($QSO_2NCO$), cyanic acid, thiocyanic acid, and compounds containing a metal-NCO radical such as tributyltin isocyanate.

Also included as useful in the preparation of the flexible polyester urethane foams in accordance with the process of this invention are the polyisocyanates of the aniline-formaldehyde polyaromatic type which are produced by phosgenation of the polyamine obtained by acid-catalyzed condensation of aniline with formaldehyde. Poly(phenylmethylene) polyisocyanates of this type are available commercially under such trade names as PAPI, AFPI, Mondur MR, Isonate 390 P, NCO–120 and NCO–20. These products are low viscosity (50–500 centipoises at 25° C.) liquids having average isocyanate functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than two isocyanato groups per molecule. Illustrative of such combinations are: a mixture of 2,4-tolylene diisocyanate, 2,6-tolylene diisocyanate and the aforesaid poly (phenylmethylene) polyisocyanates; and a mixture of isomeric tolylene diisocyanates with polymeric tolylene diisocyanates obtained as residues from the manufacture of the diisocyanates.

The polyisocyanate reactant of the foam-producing reaction mixture is generally employed in an amount that provides from about 80 to about 150 percent, usually from about 90 to about 120 percent, of the stoichiometric amount of the isocyanato groups required to react with all of the hydroxyl groups of the polyester polyol reactant and any water present as a blowing agent. That is, the total —NCO equivalent to total active hydrogen equivalent is generally within the range of about 0.8 to about 1.50, usually about 0.9 to about 1.2, equivalents of —NCO per equivalent of active hydrogen.

The reaction mixtures employed to produce flexible polyester urethane foam in accordance with the teachings of the present invention also contain a catalyst for accelerating the isocyanate-reactive hydrogen reaction. This component usually comprises a tertiary amine and is typically illustrated by the following: N-methylmorpholine; N-ethylmorpholine; N-octadecylmorpholine (N-cocomorpholine); triethylamine; tributylamine; trioctylamine; N,N,N'N'-tetramethylethylenediamine; N,N,N',N'-tetramethyl - 1,3 - butane diamine; triethanolamine; N,N - dimethylethanolamine; triisopropanolamine; N - methyldecethanolamine; bis(2-dimethylaminoethyl)ether; hexadeyldimethylamine; N,N-dimethylbenzylamine; trimethylamine; triethylenediamine (i.e., 1,4-diazabicyclo-[2.2.2]-octane); the formate and other salts of triethylenediamine, oxyalkylene adducts of the amino groups of primary and secondary amines and other such amine catalysts which are well known in the art of flexible polyurethane foam preparation. Although metal-containing catalysts such as stannous octoate are usually employed in the preparation of flexible polyether urethane foam, such metal catalysts are not preferred in the manufacture of flexible polyester foam.

It is to be understood that the aforesaid amines may be used as essentially the sole amine catalyst of the reaction mixtures employed in this invention or any combination of two or more such amines may be employed. The amine catalyst may also be introduced into the reaction mixture in the form of a solvent solution containing from about 10 to about 80 weight percent of total active catalyst. Suitable carrier solvents of amine catalysts include water-soluble glycols such as diethylene glycol; dipropylene glycol; and 2-methyl-2,4-pentanediol ("hexylene glycol").

The catalyst may also be used in combination with other additives such as any of the non ionic organic surfactants described above in connection with the solution compositions of this invention. Examples of non ionics which are especially useful as components of the catalyst solutions are the oxyethylated nonylphenol compounds represented by the general formula $$C_9H_{19}\!-\!C_6H_4\!-\!(OC_2H_4)_k\!-\!OH$$

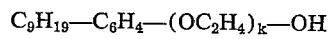

wherein $k$ is a number having an average value of from about 9 up to about 20 or more, including average values of $k$ which are either whole or fractional numbers such as 9, 10.5, 15 and the like. When used, the non ionic organic surfactant may be present in an amount from about 10 to about 80 weight percent, based on the total weight of the catalyst solution. The catalyst solution may also include minor amounts of polysiloxane-polyoxyalkylene block copolymers and/or the organosilicone polymers of this invention.

It is to be understood that any of the aforesaid amine catalysts or solutions thereof can be added directly to the foam-producing reaction mixture or they can be added in premixed form with water and the polymeric organosilicone foam stabilizers of this invention. In the latter event, the catalyst is preferably added as a component of the above-described homogeneous aqueous premixtures of this invention.

The amine catalyst is present in the final foam-producing reaction mixture in an amount of from about 0.2 to about 8 parts by weight of active catalyst (that is, the amine exclusive of other components present in solutions thereof) per 100 parts by weight of the polyester polyol reactant.

Foaming can be accomplished by employing a minor amount of a polyurethane blowing agent such as water, in the reaction mixture, the reaction of water and isocyanate generating carbon dioxide blowing agent, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquified gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichloromonofluoromethane, dichloro-difluoromethane, 1,1-dichloro-1-fluoroethane, 1,1,1-trifluoro-2-fluoro-3,3-difluoro - 4,4,4 - trifluorobutane, hexafluorocyclobutene and octafluorocyclobutane. Another useful class of blowing agents include thermally-unstable compounds which liberate gases upon heating, such as N,N'-dimethyl-N,N' - dinitroso - terphthalamide, and the like. The generally preferred method of foaming for producing flexible foams is the use of water or a combination of water plus a fluorocarbon blowing agent such as trichloromono-fluoromethane.

The amount of blowing agent employed in the foaming reaction will vary with factors such as the density that is desired in the foamed product. Usually, however, from about 1 to about 30 parts by weight of the blowing agent per 100 parts by weight of the polyester polyol starting material is preferred.

The organic flame retardants that can be employed in producing flame-retarded flexible polyester foams in accordance with the teachings of this invention can be chemically combined in one of the other of the materials used (e.g., in the polyester polyol), or can be discrete chemical compounds added as such to the foam formulation. The flame-retardants preferably contain phosphorus or halogen, or both phosphorus and halogen. Flame-retardants of the discrete chemical compound variety include: 2,2 - di(bromoethyl) - 1,3 - propanediol; tris(2-chloroethyl)phosphate [$(ClCH_2CH_2O)_3P(O)$]; 2,3 - dibromopropanol; brominated phthalate ester diols (e.g., from tetrabromophthalic anhydride and propylene oxide); oxypropylated phosphoric acid; polyol phosphites [e.g., tris(dipropylene glycol)phosphite]; polyol phosphonates [e.g., bis(dipropylene glycol) hydroxymethane phosphonate]; tris(2,3 - dibromopropyl)phosphate; tris(1,3-dichloropropyl)phosphate; tetrabromobisphenol-A; tetrabromophthalic anhydride; tetrachlorophthalic anhydride; chlorendic acid and its anhydride; diallyl chlorendate; 2, 4,6-tribromophenol; pentabromophenol; bis(2,3-dibromopropyl)phosphoric acid or salts thereof; tris(1-bromo-3-chloroisopropyl)phosphate; brominated anilines and dianilines; diethyl-N,N-bis(2 - hydroxyethyl)aminomethyl phosphonate; di-poly(oxyethylene) hydroxymethyl phosphonate; O,O-diethyl-N,N - bis(2 - hydroxyethyl)aminomethyl phosphonate; di-poly(oxypropylene) phenyl phosphonate; di-poly(oxypropylene) chloromethyl phosphonate; di-poly(oxypropylene) butyl phosphate; and other flame retardants known to the art. The aforesaid compounds may be used as essentially the sole flame retardant or various combinations thereof may be used.

Those of the above flame-retardants of the discrete chemical compound variety which contain groups reactive with hydroxy or isocyanato groups can be used as reactants in producing the polyester polyols or can be reacted with organic polyisocyanates to produce modified polyols or polyisocyanates having chemically combined flame-retardant groups. Such modified polyester and polyisocyanates are useful as reactants in the process of this invention. In such cases, due regard must be given to the possible effect of the functionality of the compound on the other properties (e.g., degree of flexibility) of the resulting foam.

The flame retardant can be used in an amount from about 1 to about 25 parts by weight per 100 parts by weight of the polyester polyol reactant.

Other additional ingredients can be employed in minor amounts in producing polyester urethane foams in accordance with the process of this invention, if desired, for specific purposes. Thus the aforesaid inhibitors such as "Ionol" (which can also be added as components of the aqueous premixed solutions of this invention) can be added directly to the final foam formulations. Similarly, hexylene glycol can be added to the final formulation as a compression set additive, although it can also be introduced as a component of the solution compositions of this invention. Paraffin oil can be added to regulate cell structure so as to coarsen cells and thereby reduce the tendency of the foam to split. Other additives that can be employed are dyes or pigments and anti-yellowing agents.

The process described herein for the production of flexible polyester urethane foam, can be carried out in accordance with the prepolymer technique in accordance with which the polyester polyol and polyisocyanate are prereacted such that a substantial amount of unreacted isocyanate groups remain. The resulting prepolymer is then combined with the foam stabilizers of this invention, amine catalyst and blowing agent. Usually, however, the process is carried out as a "one-shot" process in which the polyester polyol and polyisocyanate reactants are independently added to the foam-producing reaction mixture. The foaming and urethane-forming reactions occur without the application of external heat. Often the resulting foam is cured by heating the foam at a temperature between about 100° C. and about 150° C. for about 10 to about 60 minutes to eliminate any surface tackiness, as desired. It is to be understood that variations in process conditions and manipulative steps can be used as known in the art. For example, the various ingredients of the reaction mixture can be combined and the foaming reaction mixture poured into a mold, or the various ingredients can be combined and the foaming reaction mixture commenced and completed in a mold.

The relative amounts of the various components reacted in accordance with the above-described process for producing flexible polyester urethane foams are not narrowly critical. The polyester polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, amine catalyst and the organosilicone polymeric foam stabilizers are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the organosilicone polymers of this invention are present in a foam-stabilizing amount, that is, in an amount sufficient to stabilize the foam. The preferred amounts of these various components are as given hereinabove.

The flexible polyester urethane foams produced in accordance with this invention can be used in the same areas as conventional flexible polyester urethane foams. For example, they can be used as textile interliners, cushioning materials for seating and for packaging delicate objects, and as gasketing materials.

The following examples are offered as illustrative of the present invention and are not to be construed as limitative.

Molecular weights given in the examples for various polymer compositions of this invention, were measured by Gel Permeation Chromatography (abbreviated in the examples as "G.P.C.") using a calibration curve showing the relationship between the respective elution volumes established for dimethylsiloxane fluids of different molecular weights and the respective known molecular weights of such fluids. In establishing the calibration curve, the various dimethylsiloxane fluids were in solution in trichloroethylene solvent. In measuring the molecular weights of the polymers described herein, the elution volume observed for any particular polymer product (in trichloroethylene solvent) was equated with the corresponding elution volume of the calibration curve, and the molecular weight associated with that particular elution volume was assigned as the molecular weight of the polymer product. The use of Gel Permeation Chromatography for measuring molecular weights is discussed in "Polymer Fractionation" (ed. Manfred J. R. Cantow, Academic Press, Inc., New York, 1967), pp. 123–173, chapter B4, entitled, "Gel Permeation Chromatography," by K. H. Altgelt and J. C. Moore.

The following Examples 1 and 2 illustrate the preparation of polymers of this invention containing $SiO_{4/2}$,

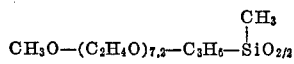

and $(CH_3)_3SiO_{1/2}$ units, which polymers are designated herein as Surfactants A and B, respectively.

EXAMPLE 1

(a) Preparation of
$$CH_3O\text{---}(C_2H_4O)_{7.2}\text{---}C_3H_6\text{---}Si(CH_3)Cl_2$$

The allyl end-blocked polyether having an average molecular weight of about 389 and the average composition $CH_2=CHCH_2(OC_2H_4)_{7.2}OCH_3$, was mixed in an amount of 1200 grams (3.1 mols) with 600 ml. of toluene and 10 parts per million (p.p.m.) of Pt as $H_2PtCl_6$ in a round-bottom flask equipped with a reflux condenser, stirrer and thermometer. The mixture was heated to 60° C. and while at that temperature, about 3 mols (345.15 grams) of methyldichlorosilane [H—Si($CH_3$)($Cl$)$_2$], was added to the mixture at such a rate to maintain the temperature at about 85°–95° C. After completion of the reaction and removal of toluene solvent by rotary evaporation, 1540 grams of product was provided. The reaction product has the average formula,

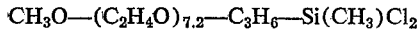

(b) Preparation of Surfactant A

The apparatus employed in this example comprised a 3-necked reaction flask equipped with a mechanical stirrer, distilling column (vacuum-jacket strip-silvered; effective length 60 cm.; Helices packing ¼ inch I.D.) with take-off head and thermometer. The reaction flask contained a mixture of trimethylchlorosilane (54.25 grams; 0.5 mol), tetraethoxysilane (93.7 grams, 0.45 mol),

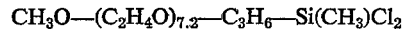

(252.0 grams; 0.5 mol) prepared in accordance with paragraph (a) above, and 500 ml. of toluene. Water was added to this mixture in an amount of 59.6 grams (about 100 percent excess over stoichiometry) without applying external heat. The reaction was exothermic. After the completion of water addition, the reaction mixture was allowed to stir for about 2 hours at ambient temperature. After this period of time, the mixture was heated and volatiles (ethanol-water-HCl-toluene) were removed (boiling range 70°–95° C.), followed by the removal of excess water at 100° C. The reaction mixture was further heated to reach the reflux temperature of toluene (110° C. at the head) and was kept at this point for several minutes. The reaction mixture was then cooled, neutralized with sodium bicarbonate and filtered. After further removal of toluene by rotary evaporation at 50° C. and 1 mm. mercury pressure, the reaction product weighed 250 grams (83 weight percent yield, based on complete hydrolysis). Analysis of the product showed the presence of residual —OH and —OC$_2$H$_5$ (0.8 and 1.6 weight percent, respectively). Based on the relative molar proportions of reactants employed, the mole ratio $(a:b:c)$ of the

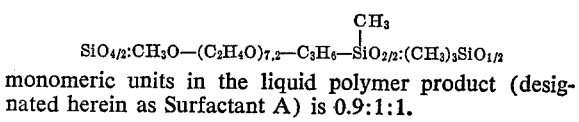

monomeric units in the liquid polymer product (designated herein as Surfactant A) is 0.9:1:1.

EXAMPLE 2

Preparation of Surfactant B

The reaction of this example was carried out in a reaction vessel equipped with a thermometer, condenser with take-off head, and stirrer. The reaction mixture contained 400 ml. of xylene, 0.5 mol of each of trimethylchlorosilane (54.25 grams) and

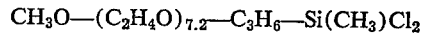

(252.0 grams) prepared as described in accordance with Example 1(a) above, and 0.8 mole of tetraethoxysilane (167.0 grams). While stirring this mixture, water (37.8 grams) was slowly added thereto, followed by stirring of the reaction mixture for 4 hours at ambient temperature. After removal of volatiles below 101° C., filtration and solvent removal, 302.0 grams of liquid polymer product was obtained. The product has a molecular weight of about 4300 (G.P.C.) and residual —OH and —OC$_2$H$_5$ contents of 1.2 and 2.1 weight percent, respectively. Based on the relative molar proportions of reactants, the mole ratio $(a:b:c)$ of the

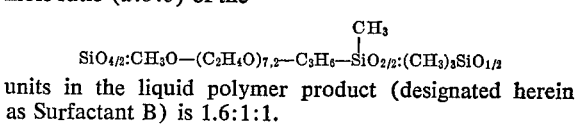

units in the liquid polymer product (designated herein as Surfactant B) is 1.6:1:1.

The following Examples 3–9 illustrate the preparation of polymers containing $SiO_{4/2}$,

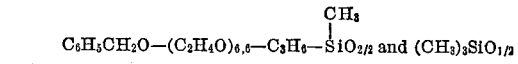

units, designated herein as Surfactants C through H and J, respectively. In the preparation of these surfactants, the polyether-substituted methyldichlorosilane reactants were produced in accordance with the procedure typically illustrated by Example 3(a) below using substantially the same allyl end-blocked polyether starting material.

EXAMPLE 3

(a) Preparation of
$$C_6H_5CH_2O\text{---}(C_2H_4O)_{6.6}\text{---}C_3H_6\text{---}Si(CH_3)Cl_2$$

Following the procedure of Example 1(a) above, 438 grams (1 mole) of the allyl end-blocked, benzyl-capped polyether having a molecular weight of about 438 and the average composition,

(capping about 95 percent) was reacted in 200 ml. of toluene solvent with methyldichlorosilane (115 grams; 1 mole) in the presence of 10 p.p.m. of Pt as $H_2PtCl_6$. Removal of toluene solvent provided 550 grams of addition product having the average composition,

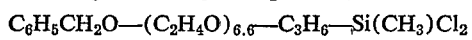
$$C_6H_5CH_2O-(C_2H_4O)_{6.6}-C_3H_6-Si(CH_3)Cl_2$$

(b) Preparation of Surfactant C

The reaction of this example was carried out in essentially the same manner as in Example 2 except that: the reaction mixture contained 200 ml. of xylene and 0.25 mol of each of trimethylchlorosilane (27.12 grams),

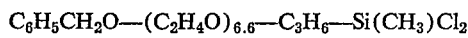
$$C_6H_5CH_2O-(C_2H_4O)_{6.6}-C_3H_6-Si(CH_3)Cl_2$$

(138.8 grams) prepared in accordance with Example 3(a) and tetraethoxysilane (52 grams); and the amount of water added thereto was 38 grams. Analysis of the liquid product (148 grams) showed the presence of residual —OH and —OC$_2$H$_5$ contents of 1.1 and 0.25 weight percent, respectively. Based on the relative molar proportions of reactants employed, the mole ratio ($a$:$b$:$c$) of the

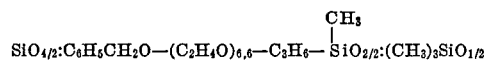
$$SiO_{4/2}:C_6H_5CH_2O-(C_2H_4O)_{6.6}-C_3H_6-\overset{\underset{\mid}{CH_3}}{Si}O_{2/2}:(CH_3)_3SiO_{1/2}$$

units in the polymer product (designated herein as Surfactant C) is 1:1:1.

EXAMPLES 4–7

In accordance with these examples, four additional polymers were prepared, designated herein as Surfactants D, E, F and G, using the reactants and amounts thereof as set forth in the following Table I. In Examples 4, 6 and 7, 200 ml. of xylene was used as solvent, the reaction mixture of Example 5 containing 400 ml. of xylene. The respective procedures were essentially as described under Example 2 above. The relative proportions of the monomeric units contained in the respective liquid polymer products are expressed in Table I by the ratio, $a$:$b$:$c$.

an amount of 324 grams. After the water addition was completed, the reaction mixture was stirred at ambient temperature for several hours. The mixture was then heated and volatiles (ethanol-water-HCl-xylene) were removed (boiling range of 70°–95° C.). The reaction mixture was then cooled, neutralized with sodium bicarbonate and filtered. Removal of xylene by rotary evaporation afforded the product (2460 grams). Analysis of the product showed a silicon content of 11.0 weight percent (calculated Si=13.1%) and the presence of residual —OH and —OC$_2$H$_5$ contents of 1.2 and 0.2 weight percent, respectively. The molecular weight (G.P.C.) of the product, was 3900. Based on the relative molar proportions of reactants employed, the SiO$_{4/2}$,

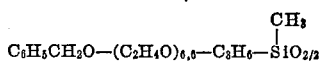
$$C_6H_5CH_2O-(C_2H_4O)_{6.6}-C_3H_6-\overset{\underset{\mid}{CH_3}}{Si}O_{2/2}$$

and (CH$_3$)$_3$SiO$_{1/2}$ monomeric units are present in the liquid polymer product (designated herein as Surfactant H) in equimolar proportions (that is, the $a$:$b$:$c$ ratio is about 1:1:1).

EXAMPLE 9

Preparation of Surfactant J

The reaction of this example was carried out in essentially the same manner as in Example 8 above, except that: the reaction mixture contained 300 ml. of xylene, 0.5 mol of each of trimethylchlorosilane (54.25 grams) and $$C_6H_5CH_2O-(C_2H_4O)_{6.6}-C_3H_6-Si(CH_3)Cl_2$$

(276.5 grams), and 0.45 mol of tetraethoxysilane (93.7 grams); and the amount of water added thereto was 59.5 grams (100 percent excess over stoichiometry). Analysis of the product (285.5 grams) showed the presence of residual —OH and —OC$_2$H$_5$ in amounts of 1.2

TABLE I

|  | Example |  |  |  |
|---|---|---|---|---|
|  | 4 | 5 | 6 | 7 |
| Surfactant | D | E | F | G |
| Reactants: |  |  |  |  |
| Si(OC$_2$H$_5$)$_4$: |  |  |  |  |
| Grams | 52.0 | 167 | 31.23 | 52.0 |
| Mols | 0.25 | 0.8 | 0.15 | 0.25 |
| C$_6$H$_5$CH$_2$O—(C$_2$H$_4$O)$_{6.6}$—C$_3$H$_6$—$\overset{\underset{\mid}{CH_3}}{Si}$Cl$_2$: |  |  |  |  |
| Grams | 138.8 | 277.0 | 138.8 | 138.8 |
| Mols | 0.25 | 0.5 | 0.25 | 0.25 |
| (CH$_3$)$_3$SiCl: |  |  |  |  |
| Grams | 27.12 | 54.25 | 27.12 | 43.35 |
| Mols | 0.25 | 0.5 | 0.25 | 0.4 |
| Water, grams | 38 | 40.0 | ¹ 40 | ¹ 40 |
| Polymer product: |  |  |  |  |
| Weight, grams | 149 | 308 | 140 | 152 |
| Residual—OH, weight percent | 1.5 | 0.9 | 1.25 | 1.17 |
| Residual—OC$_2$H$_5$, weight percent | 3.5 | 3.0 | 0.14 | 0.14 |
| Molecular weight (G.P.C.) | 4,100 | 6,000 | 3,300 | -------- |
| Mole ratio of units, a:b:c ² | 1:1:1 | 1.6:1:1 | 0.6:1:1 | 1:1:1.6 |

¹ Mililiters.
² Designates the mole ratio of SiO$_{4/2}$:C$_6$H$_5$CH$_2$O—(C$_2$H$_4$O)$_{6.6}$—C$_3$H$_6$—CH$_3$iO$_{2/2}$:(CH$_3$)$_3$ 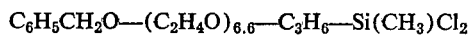
SiO$_{1/2}$, respectively, based on the relative molar proportions of reactants.

EXAMPLE 8

Preparation of Surfactant H

The reaction of this example was carried out in a reaction vessel equipped with a thermometer, condenser with take-off head, and stirrer. The reaction mixture contained 3000 ml. of xylene, and about 4 moles of each of trimethylchlorosilane (432 grams), $$C_6H_5CH_2O-(C_2H_4O)_{6.6}-C_3H_6-Si(CH_3)Cl_2$$

(2212 grams) and tetraethoxysilane (832 grams). While stirring this mixture, water was slowly added thereto in and 0.1, respectively. Based on the relative proportions of reactants, the mole ratio of

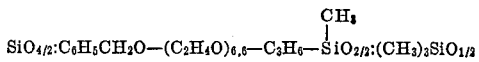
$$SiO_{4/2}:C_6H_5CH_2O-(C_2H_4O)_{6.6}-C_3H_6-\overset{\underset{\mid}{CH_3}}{Si}O_{2/2}:(CH_3)_3SiO_{1/2}$$

units in the liquid polymer product (designated herein as Surfactant J) is 0.9:1:1.

EXAMPLES 10–13

Preparation of Surfactants K, L, M and N

In accordance with these examples, four additional polymers of this invention, designated herein as Surfactants, K, L, M and N, were prepared using the reactants and amounts thereof as set forth in the following Table II. The cohydrolysis-cocondensation reaction of Example 10 was carried out in toluene solvent in substantially the same manner described for Example 1(b). The reactions of Examples 11–13 were carried out in xylene. The clear liquid polymer product of Example 10 (Surfactant K), was found to contain 11.1 weight percent silicon and 0.4 weight percent residual toluene, and has a viscosity of 271 centistokes at 25° C. The respective molecular weights (G.P.C.), residual silicon-bonded hydroxyl and ethoxy contents and the relative molar proportions (expressed as the $a:b:c$ ratio) of the monomeric units contained in Surfactants K through N are indicated in the following Table II.

TABLE III.—FOAM FORMULATION A

| Component: | Parts by weight |
|---|---|
| Surfactant (0.35, 0.5 and 1) | Varied |
| Polyester polyol [1] | 100.0 |
| N-ethylmorpholine | 1.9 |
| Hexadecyldimethylamine | 0.3 |
| Water | 3.6 |
| Tolylene diisocyanate (Index 105) [2] | 45.2 |
| Tris(2-chloroethyl)phosphate | 7.0 |

[1] The polyester polyol employed was a commercially available polyester resin produced from adipic acid, diethylene glycol and trimethylol propane in a mole ratio of approximately 1:1:0.2. This polyester has a hydroxyl number of about 50 to 56, a molecular weight of about 2,000, an acid number not greater than 2 and a viscosity of about 17,000 centistokes at about 25° C. This particular polyester is sold under the name "Witco Fomrez No. 50."

[2] This component was a mixture of 2,4-tolylene diisocyanate (80 weight percent) and 2,6-tolylene diisocyanate. Index 105 means that the amount of mixture employed was 105 percent of the stoichiometric amount required to react with the polyester polyol and water present in the foam formulation.

TABLE II

| | Example | | | |
|---|---|---|---|---|
| | 10 | 11 | 12 | 13 |
| Surfactant | K | L | M | N |
| Reactants, parts by weight: | | | | |
| $Si(OC_2H_5)_4$ | 452 | 103.1 | 26.0 | 26.0 |
| $C_6H_5CH_2O-(C_2H_4O)_d-C_3H_6-Si(CH_3)Cl_2$ | 1,600 | 153.9 | 47.0 | 139.7 |
| Average value of $d$ | 8.5 | 8.1 | 8.1 | 8.1 |
| $(CH_3)_3SiCl$ | 274 | 26.9 | 13.6 | 6.8 |
| Water | 285 | 27 | 6.6 | 7.8 |
| Polymer product: | | | | |
| Residual —OH | 0.9 | 1.4 | 1.2 | 2.0 |
| Residual —OC$_2$H$_5$ | 0.1 | 2.4 | 0.2 | 0.5 |
| Molecular weight (G.P.C.) | 4,100 | 3,500 | 2,400 | 3,000 |
| Mole ratio of units, a:b:c [1] | 0.9:1:1 | 2:1:1 | 1.6:1:1.6 | 0.6:1:0.3 |

[1] Designates the mole ratio of $SiO_{4/2}:C_6H_5CH_2O-(C_2H_4O)_d-C_3H_6-CH_3iO_{2/2}:(CH_3)_3\underset{S}{|}$
 respectively, based on the relative molar proportions of reactants. (SiO$_{1/2}$)

EXAMPLE 14

Preparation of Surfactant O

In accordance with this example, 30 grams of Surfactant D identified in Table I above, was dissolved in 80 ml. of toluene in a nitrogen atmosphere. To this mixture, 0.3 gram of N-ethylmorpholine was added, followed by the addition of 5 grams of methyl isocyanate. The reaction mixture was heated at 60°–70° C. for 2 hours under nitrogen followed by cooling and solvent removal by rotary evaporation. The liquid product (designated herein as Surfactant O) had a molecular weight (G.P.C.) of 7100 and, upon analysis, was found to contain 10.3 weight percent silicon (calculated Si=13.1 weight percent) and residual —OH and —OC$_2$H$_5$ contents of about 1 and 0.2 weight percent, respectively.

EXAMPLE 15

Preparation of Surfactant P

In accordance with this example, 30 grams of Surfactant E identified in Table I above, was dissolved in 80 ml. of toluene and treated with 0.3 gram of N-ethylmorpholine and 5 grams of methyl isocyanate, following the procedure of Example 14. The liquid product (designated herein as Surfactant P) had a molecular weight (G.P.C.) of 7200 and, upon analysis, was found to contain 0.7 and 1.1 weight percent of residual —OH and —OC$_2$H$_5$ groups, respectively.

In the following Examples 16–30, foams were produced using the above-described Surfactants A through H and J through P of the present invention as the respective foam-stabilizing surfactant component of the foam-producing reaction mixture, designated herein as Foam Formulation A, which had the following composition:

The runs of Examples 16–30 were carried out in accordance with substantially the same general procedure which entailed the following steps. The surfactant, amine catalysts and water were premixed in a 50 milliliter beaker. The polyester polyol reactant was weighed into a tared 32-ounce capacity container. The flame-retardant [tris(2-chloroethyl)phosphate] and tolylene diisocyanate reactant were also weighed into the container and mixed with a spatula until homogeneous. Further mixing was done on a drill press equipped with a double three-bladed marine-type propellor about three inches in diameter. The mixing in the drill press was accomplished at 1000 revolutions per minute for eight seconds. Then the premixture of surfactant, catalyst and water was added and mixing was continued for seven additional seconds. The reaction mixture was poured into a 12 in. x 12 in. x 12 in. cardboard box, was allowed to rise and was then cured for about 30 minutes at 130° C. In most instances, samples were prepared for breathability measurements and for a determination of burning resistance (burning extent and flame rating) in accordance with ASTM 1692–59T.

The following terms are used to describe the quality of the foams produced in the examples:

"Rise" denotes the foam height and is directly proportional to potency of the surfactant.

"Breathability" denotes the porosity of a foam, being roughly proportional to the number of open cells in a foam, and was measured in accordance with the NOPCO breathability test procedure described by R. E. Jones and G. Fesman, Journal of Cellular Plastics, January 1965. In accordance with this test, breathability is measured as follows: A 2 inch x 2 inch x 1 inch piece of foam is cut from near the center of the bun. Using a Nopco Foam Breathability Tester, Type G. P.–2 Model 40 G. D. 10, air is drawn through the one inch portion at a pressure differential of 0.5 inch of water less than atmospheric pressure. The air flow is parallel to direction of original foam rise. The degree of openness of the foam (or foam breathability) is measured by air flow and is expressed as standard cubic feet per minute (s.c.f.m.).

"Burning Extent" denotes the burned length of a test specimen of foam as measured in accordance with standard test procedure ASTM 1692–59T.

"SE" indicates that, on the basis of the results obtained in the aforesaid ASTM 1692–59T test, the foam is rated as self-extinguishing.

EXAMPLES 18–26

In these examples, Surfactants C, F, G, H and J through N of the above Examples 3, 6, 7, 8 and 9 through 13, respectively, were employed as the surfactant component of Foam Formulation A of the above Table III. Each of the respective examples includes three foaming reactions (indicated as −1, −2 and −3) which were carried out at different concentrations of surfactants using the above-described general procedure. The mole ratio ($a:b:c$) of the monomeric units present in these surfactants, the concentration thereof and the results are given in the following Table V.

TABLE V

Stabilization of flexible polyester foaming using surfactants containing $SiO_{4/2}$, $$C_6H_5CH_2O-(C_2H_4O)_d-C_3H_6-\underset{\underset{C}{|}}{Si}O_{2/2}$$ and $(CH_3)_3SiO_{1/2}$ units in a mole ratio of $a:b:c$, respectively, as defined below

| Example No. | Surfactant Designation | $a:b:c$ | Parts by wt. in foam formulation A | Rise, inches | Breathability, s.c.f.m. | Burning extent, inches | Flame rating |
|---|---|---|---|---|---|---|---|
| 18–1 | C [1] | 1:1:1 | 0.35 | 5.7 | 1.8 | 2 | SE |
| 18–2 | C | 1:1:1 | 0.5 | 5.8 | 1.8 | 2.1 | SE |
| 18–3 | C | 1:1:1 | 1.0 | 5.8 | 1.9 | 3.0 | SE |
| 19–1 | F [1] | 0.6:1:1 | 0.35 | 5.7 | 1.2 | 1.1 | SE |
| 19–2 | F | 0.6:1:1 | 0.5 | 5.7 | 2.1 | 1.5 | SE |
| 19–3 | F | 0.6:1:1 | 1.0 | 5.7 | 2.5 | 1.5 | SE |
| 20–1 | G [1] | 1:1:1.6 | 0.35 | 5.6 | 2.6 | 1.5 | SE |
| 20–2 | G | 1:1:1.6 | 0.5 | 5.7 | 2.7 | 1.6 | SE |
| 20–3 | G | 1:1:1.6 | 1.0 | 5.7 | 3 | 1.9 | SE |
| 21–1 | H [1] | 1:1:1 | 0.35 | 5.9 | 3 | 1.6 | SE |
| 21–2 | H | 1:1:1 | 0.5 | 5.8 | 2.5 | 2.4 | SE |
| 21–3 | H | 1:1:1 | 1.0 | 5.8 | 2.8 | 2.8 | SE |
| 22–1 | J [1] | 0.9:1:1 | 0.35 | 5.8 | 2.3 | 1.3 | SE |
| 22–2 | J | 0.9:1:1 | 0.5 | 5.8 | 3.1 | 1.7 | SE |
| 22–3 | J | 0.9:1:1 | 1.0 | 5.9 | 3.9 | 2.2 | SE |
| 23–1 | K [2] | 0.9:1:1 | 0.35 | 5.8 | 2.3 | 1.3 | SE |
| 23–2 | K | 0.9:1:1 | 0.5 | 5.8 | 3.0 | 1.7 | SE |
| 23–3 | K | 0.9:1:1 | 1.0 | 5.9 | 3.9 | 2.1 | SE |
| 24–1 | L [3] | 2:1:1 | 0.35 | 5.6 | Tight | | |
| 24–2 | L | 2:1:1 | 0.5 | 5.4 | Tight | | |
| 24–3 | L | 2:1:1 | 1.0 | 5.7 | 1.1 | | |
| 25–1 | M [3] | 1.6:1:1.6 | 0.35 | 3.8 | (4) | | |
| 25–2 | M | 1.6:1:1.6 | 0.5 | 5.4 | (4) | | |
| 25–3 | M | 1.6:1:1.6 | 1.0 | 5.4 | Tight | | |
| 26–1 | N [3] | 0.6:1:0.3 | 0.35 | 5.6 | Tight | | |
| 26–2 | N | 0.6:1:0.3 | 0.5 | 5.6 | Tight | | |
| 26–3 | N | 0.6:1:0.3 | 1.0 | 5.7 | 1 | | |

[1] Average value of $d$ in polyether chain is 6.6.
[2] Average value of $d$ in polyether chain is 8.5.
[3] Average value of $d$ in polyether chain is 8.1.
[4] Coarse.

EXAMPLES 16–17

The surfactants employed in these examples were the above-described Surfactants A and B in which the respective mole ratios of the $SiO_{4/2}$,

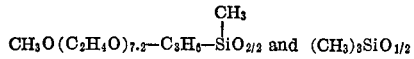

$$CH_3O(C_2H_4O)_{7.2}-C_3H_6-\underset{\underset{CH_3}{|}}{Si}O_{2/2}$$ and $(CH_3)_3SiO_{1/2}$ units are 0.9:1:1 and 1.6:1:1, respectively. The breathability and burning extent of foams produced using these polymers in Foam Formulation A of Table III above, were measured at three different polymer concentrations. The amount of surfactant employed and the results are as follows:

TABLE IV

| | Example number | | | | | |
|---|---|---|---|---|---|---|
| | 16 | | | 17 | | |
| Surfactant | A | | | B | | |
| Parts by wt | 0.35 | 0.5 | 1.0 | 0.35 | 0.5 | 1.0 |
| Rise, inches | 5.8 | 5.9 | 5.9 | 5.8 | 5.8 | 5.8 |
| Breathability, s.c.f.m | 3 | 3.2 | 3.8 | 1.1 | 3.2 | 3.7 |
| Burning extent inches | 3 | 3.0 | 3.6 | 1.3 | 3.0 | 3.2 |
| Flame rating | | | Self-extinguishing | | | |

The results of Table IV indicate that Surfactants A and B of this invention have a good combination of potency and processing latitude as stabilizers of flexible polyester foam and, in addition, possess the further desirable property of allowing for the formation of self-extinguishing flame-retarded foams.

The results of Table V indicate that Surfactants C, F, G, H and J through N of this invention were effective stabilizers of flexible polyester urethane foam as indicated by foam rise. Although Surfactants L, M and N had overall good potency as stabilizers and provided useful foams, the foamed products produced therewith tended to be "tight" indicating close celled foams, or "coarse" indicating foams having fewer cells (about 25 or less) per linear inch. Of these various surfactants, the best overall combination of properties was exhibited by Surfactants C, F, G, H, J and K in which the respective mole ratios ($a:b:c$) of monomeric units are within the preferred range expressed herein, that is, about 0.6–1.8:1:0.8–1.8 and the ratio of $a+c:b$ is 1.4–2.8:1. As shown by the data of Table V, these preferred surfactants provided more open foams than Surfactants L, M and N, as indicated by the breathability measurements.

EXAMPLES 27–28

The surfactants employed in these examples were Surfactant D (prepared as described in Example 4) in which the $SiO_{4/2}$,

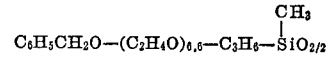

$$C_6H_5CH_2O-(C_2H_4O)_{6.5}-C_3H_6-\underset{\underset{CH_3}{|}}{Si}O_{2/2}$$

and $(CH_3)_3SiO_{1/2}$ monomeric units were present in equimolar proportions, and Surfactant O which is the polymer product obtained by treatment of Surfactant D with methyl isocyanate as described in Example 14. The breathability and burning extent of foams produced using these polymers as the foam stabilizing surfactant of Foam Formulation A of Table III above, were measured at three different polymer concentrations. The amount of surfactant employed and the results are given in Table VI which also indicates the residual hydroxyl and ethoxy contents of each surfactant.

TABLE VI

| | Example number | | | | | |
|---|---|---|---|---|---|---|
| | 27 | | | 28 | | |
| Surfactant | D | | | 0 | | |
| —OH, wt. percent | 1.5 | | | 1 | | |
| —OC$_2$H$_5$, wt. percent | 3.5 | | | 0.2 | | |
| Parts by wt | 0.35 | 0.5 | 1.0 | 0.35 | 0.5 | 1.0 |
| Rise, inches | 5.8 | 5.7 | 5.8 | 5.8 | 5.9 | 5.9 |
| Breathability, s.c.f.m | 1.8 | 1.9 | 2.3 | 2.4 | 2.8 | 3.7 |
| Burning extent, inches | 2 | 2.1 | 2.1 | 1.4 | 1.6 | 2.6 |
| Flame rating | Self-extinguishing | | | | | |

EXAMPLES 29–30

The surfactants employed in these examples were Surfactant E (prepared as described in Example 5) in which the SiO$_{4/2}$,

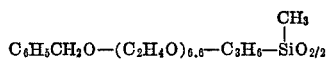

$$C_6H_5CH_2O-(C_2H_4O)_{6.6}-C_3H_6-\overset{CH_3}{\underset{|}{Si}}O_{2/2}$$

and (CH$_3$)$_3$SiO$_{1/2}$ monomeric units were present in a mole ratio of 1.6:1:1, respectively, and Surfactant P which is the polymer product obtained by treatment of Surfactant E with methyl isocyanate as described in Example 15. The breathability and burning extent of foams produced using these polymers as the surfactant of Foam Formulation A of Table III above, were measured at three different polymer concentrations. The amount of surfactant employed and the results are given in Table VII which also indicates the residual hydroxyl and ethoxy contents of each surfactant.

TABLE VII

| | Example number | | | | | |
|---|---|---|---|---|---|---|
| | 29 | | | 30 | | |
| Surfactant | E | | | P | | |
| —OH, wt. percent | 0.9 | | | 0.7 | | |
| —OC$_2$H$_5$ wt. percent | 3.0 | | | 1.1 | | |
| Parts by wt | 0.35 | 0.50 | 1.0 | 0.35 | 0.5 | 1.0 |
| Rise, inches | 5.8 | 5.8 | 5.7 | 5.7 | 5.8 | 5.7 |
| Breathability, s.c.f.m | 1.5 | 1.2 | 1.5 | 2.6 | 2.8 | 3.5 |
| Burning extent, inches | 1.2 | 1.8 | 1.9 | 1.3 | 1.4 | 1.5 |
| Flame rating | Self-extinguishing | | | | | |

The data of Tables VI and VII show that in each instance Surfactants D and E and their respective methyl isocyanate derivatives were potent stabilizers of flexible polyester foam and provided good quality self-extinguishing foam. The data also show that the treatment of Surfactants D and E with methyl isocyanate substantially reduced the total content of residual hydroxyl and ethoxy groups, and that the methyl isocyanate derivatives provided more open foams as evidenced by increased breathability, without sacrifice of low burning extent.

EXAMPLES 31–37

In these examples, a potency determination was made of surfactants of this invention using a foam formulation, designated as Foam Formulation B, which contained 5 parts by weight of water per 100 parts by weight of polyester polyol reactant. The 5 parts water system is usually more difficult to stabilize than the more conventional formulations containing less water and thus provides a relatively sensitive test of potency. The composition of Foam Formulation B is as follows:

TABLE VIII.—FOAM FORMULATION B

| Component | Parts by weight |
|---|---|
| Surfactant (0.35 and 1) | Varied |
| Polyester polyol [1] | 100.0 |
| N-ethylmorpholine | 1.9 |
| Hexadecyldimethylamine | 0.3 |
| Water | 5.0 |
| Tolylene diisocyanate (Index 105) [2] | 59.4 |

[1] The polyol employed was the same as that of Foam Formulation A and is identified in footnote 1 of Table III.
[2] The isocyanate employed was the same as that of Foam Formulation A and is identified in footnote 2 of Table III.

Each of Examples 31–37 includes two foaming reactions (indicated as —1 and —2) which were carried out at different concentrations of surfactants using the general procedure described above with reference to Examples 16–30. The mole ratio (a:b:c) of the monomeric units of Surfactants B, D–G, J and K employed in these examples and the results are given in the following Table IX.

TABLE IX

Stabilization of flexible polyester foam using surfactants containing SiO$_{4/2}$, R$^{\circ\circ}$O—(C$_2$H$_4$O)d—C$_3$H$_6$—$\overset{CH_3}{\underset{|}{Si}}$O$_{2/2}$ and (CH$_3$)$_3$SiO$_{1/2}$ units in a mole ratio of a:b:c, respectively, wherein R$^{\circ\circ}$—is methyl (Surfactant B) or benzyl (Surfactants D–G, J and K), and a:b:c is defined below

| Example | Surfactant | a:b:c | Parts by wt. in foam formulation B | Rise, inches | Cell structure |
|---|---|---|---|---|---|
| 31-1 | E | 1.6:1:1 | 0.35 | 9.1 | Excellent. |
| 31-2 | E | 1.6:1:1 | 1 | 9.1 | Do. |
| 32-1 | B | 1.6:1:1 | 0.35 | 9.2 | Do. |
| 32-2 | B | 1.6:1:1 | 1 | 9.3 | Do. |
| 33-1 | D | 1:1:1 | 0.35 | 9.1 | Do. |
| 33-2 | D | 1:1:1 | 1 | 9.1 | Do. |
| 34-1 | G | 1:1:1.6 | 0.35 | 9.0 | Good. |
| 34-2 | G | 1:1:1.6 | 1 | 9.0 | Do. |
| 35-1 | J | 0.9:1:1 | 0.35 | 9.3 | Excellent. |
| 35-2 | J | 0.9:1:1 | 1 | 9.4 | Do. |
| 36-1 | K | 0.9:1:1 | 0.35 | 9.3 | Do. |
| 36-2 | K | 0.9:1:1 | 1 | 9.4 | Do. |
| 37-1 | F | 0.6:1:1 | 0.35 | 8.7 | Coarse. |
| 37-2 | F | 0.6:1:1 | 1 | 8.9 | Do. |

The results of Table IX show that Surfactants B, D–G, J and K of this invention provide foams of excellent rise even at the relatively low concentration of 0.35 part by weight per 100 parts of polyester polyol reactant, and have good processing latitude.

EXAMPLES 38–44

In accordance with these examples, Surfactant H and Surfactant K were blended with various organic compounds to provide illustrative solution compositions of this invention. These blended compositions are designated herein as Surfactants Q through W and each was used as the surfactant component of Foam Formulation A of Table III above in a concentration of 1 part by weight, following the general procedure described above with reference to Examples 16–30. In using the blended surfactans, clear, homogeneous aqueous premixtures were obtained when the water and amine catalysts of Foam Formulation A were combined therewith. The composition of the blended surfactants and the results of these examples are given in the following Table X.

TABLE X

| Example No. | Blended surfactant | | | Foam properties | | | |
|---|---|---|---|---|---|---|---|
| | No. | Components | Wt. percent of components [1] | Rise, inches | Breathability, s.c.f.m. | Burning extent, inches | Flame rating |
| 38 | Q | Surfactant H | 45.6 (46.1) | 5.9 | 2.3 | 1.6 | SE |
| | | Tall oil | 33.4 (33.7) | | | | |
| | | Hexylene glycol | 20.0 (20.2) | | | | |
| 39 | R | Surfactant H | 54.0 | 5.8 | 2.2 | 1.4 | SE |
| | | Tall oil | 23.0 | | | | |
| | | Hexylene glycol | 23.0 | | | | |

TABLE X—Continued

| Example No. | Blended surfactant | | | Foam properties | | | |
|---|---|---|---|---|---|---|---|
| | No. | Components | Wt. percent of components [1] | Rise, inches | Breathability, s.c.f.m. | Burning extent, inches | Flame rating |
| 40 | S | Surfactant H | 45.6 (46.1) | 5.9 | 2.7 | 1.5 | SE |
| | | Tall oil | 20.0 (20.2) | | | | |
| | | Hexylene glycol | 20.0 (20.2) | | | | |
| | | Anionic surfactant [2] | 13.3 (13.5) | | | | |
| 41 | T | Surfactant K | 50 | 5.8 | 2.6 | 1.5 | SE |
| | | Tall oil | 12.5 | | | | |
| | | Hexylene glycol | 37.5 | | | | |
| 42 | U | Surfactant K | 50.0 | 5.8 | 2.6 | 1.4 | SE |
| | | Tall oil | 15.0 | | | | |
| | | Organic non ionic Surfactant [3] | 35.0 | | | | |
| 43 | V | Surfactant K | 50.0 | 5.8 | 2.4 | 1.5 | SE |
| | | Tall oil | 15.0 | | | | |
| | | Organic non ionic Surfactant [4] | 35.0 | | | | |
| 44 | W | Surfactant K | 52.0 | 5.8 | 2.4 | 1.5 | SE |
| | | Tall oil | 15.6 | | | | |
| | | Hexylene glycol | 21.0 | | | | |
| | | Organic non ionic Surfactant [3] | 10.4 | | | | |
| | | "Ionol" [5] | 1.0 | | | | |

[1] Figures in parenthesis are normalized on the basis of 100 percent.
[2] Diethylamine salt of $C_{13}$— alkylated aromatic sulfonic acid.
[3] The hydrophobe is a mixture of $C_{11}$-$C_{15}$ alcohols and the hydrophile is 9 moles of ethylene oxide.
[4] The hydrophobe is nonylphenol and the hydrophile is 10.5 moles of ethylene oxide.
[5] 2,6-di-tertiary-butyl-p-cresol.

The results of Table X demonstrate that the solution compositions of organosilicone polymers of this invention also possess good potency as stabilizers of flexible polyester foam and allow for the formation of self-extinguishing foams.

A blended surfactant composition, designated herein as Surfactant I, comprising a polyoxyalkylene-polysiloxane block copolymer in combination with an anionic organic surfactant, was also tested under the conditions employed in the examples of Table X. In this test, Surfactant I which is not a composition of the present invention, was used as the surfactant component of Foam Formulation A in a concentration of 1 part by weight per 100 parts of the polyester polyol reactant, following substantially the same general procedure described above with reference to Examples 16–30. The composition of Surfactant I which is used commercially for the manufacture of flexible polyester urethane foam, and the results obtained therewith are given in Table XI (wherein Me designates a methyl group).

TABLE XI

| Composition of surfactant I [1] | Weight percent |
|---|---|
| (a) $Me_2SiO(Me_2SiO)_{5.1}[MeO(C_2H_4O)_{7.2}C_3H_6SiO]_{7.5}SiMe_3$ | 35 |
| (b) Sodium sulfonate of a petroleum hydrocarbon mixture [2] | 35 |
| (c) Tall oil | 15 |
| (d) Hexylene glycol | 15 |
| (e) "Ionol" | [3] |

[1] Not a surfactant of this invention.
[2] Typical analysis (weight percent): 62.0 sodium sulfonate, 32.7 mineral oil, 4.5 water, 0.7 inorganic salt; average molecular weight (of sulfonate portion) is 435; flash point, C.O.C., 400° F.; sold commercially under the name "Bryton 430".
[3] 2,500 parts per million parts of components (a) to (d).

Results:
Rise, inches _____ 5.8
Breathability, s.c.f.m. _____ 2.6
Burning extent, inches _____ 5.0
Flame rating _____ Burns The results of Tables X and XI show that, whereas the foams produced using the solution compositions of this invention (Surfactants Q through W) had burning extents sufficiently low to be rated as self-extinguishing, the foam produced using Surfactant I did not qualify as self-extinguishing.

In the runs summarized in the following Table XII, other polymers, designated herein as Polymers II, III and IV, which are not within the scope of the present invention, were used as the "surfactant" component of Foam Formulation A of Table III above. These polymers are identified as follows:

Polymer II contains $SiO_{4/2}$ units and the two types of monofunctional units, $(CH_3)_3SiO_{1/2}$ and

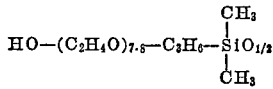

in a mole ratio of 1.6:1:1, respectively; the mole ratio of $SiO_{4/2}$:total monofunctional units, normalized on the basis of one mole of $SiO_{4/2}$, is 1:1.25.

Polymer III contains $SiO_{4/2}$ and $(CH_3)_3SiO_{1/2}$ units in a mole ratio of 1:1 and was used as a 50 weight percent solution in xylene.

Polymer IV is a commercially available product designed for use in the manufacture of polyvinyl chloride foams. It is supplied in about a 50 weight percent solution in xylene having a viscosity of 6 centistokes at 77° F. and a specific gravity of 1.00 at 77° F. On the basis of analytical data, it is believed that this polymer contains $SiO_{4/2}$ and $(CH_3)_3SiO_{1/2}$ units in a mole ratio of 1:0.8, respectively.

The runs of Table XII were carried out following the general procedure described above with specific reference to Examples 16–30 and include control runs based on the use of the above-described Surfactant K of this invention. The concentration of Surfactant K and of Polymers II, III and IV employed in each run is also given in Table XII.

TABLE XII

| Run | Surfactant | Parts by weight in foam formulation A | Rise, inches | Breathability, s.c.f.m. | Remarks |
|---|---|---|---|---|---|
| Control–1 | K[1] | 0.35 | 5.8 | 2.1 | Excellent foam. |
| 1 | Polymer II [2 6] | 0.35 | Shrunk | None | Severe shrinkage. |
| Control–2 | K[1] | 1 | 5.9 | 3.6 | Excellent cell structure. |
| 2 | Polymer III [3 6] | [5]1 | Boiled | | |
| 3 | Polymer IV [4 6] | [5]1 | Collapsed | | |

[1] $SiO_{4/2}$:$C_6H_5CH_2O-(C_2H_4O)_{8.5}-C_3H_6-SiO_{2/2}$:$(CH_3)_3SiO_{1/2}$=0.9:1:1.
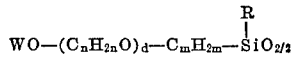
[2] $SiO_{4/2}$:[HO–$(C_2H_4O)_{7.8}$–$C_3H_6$–Si$(CH_3)_2O_{1/2}$ + $(CH_3)_3SiO_{1/2}$]=1:1.25.
[3] $SiO_{4/2}$:$(CH_3)_3SiO_{1/2}$=1:1; employed as 50 weight percent solution is xylene.
[4] $SiO_{4/2}$: $(CH_3)_3SiO_{1/2}$ believed to be 1:0.8; employed as 50 weight percent solution in xylene.
[5] Basis, weight of dissolved polymer exclusive of weight of xylene solvent.
[6] Not a polymer of this invention.

The results of Table XII show that whereas Surfactant K of this invention provided excellent flexible polyester foam, Polymers II, III and IV failed to perform as effective stabilizers.

What is claimed is:

1. A process for producing a flexible polyurethane foam by simultaneously reacting and foaming a reaction mixture of (I) a polyester containing an average of at least two hydroxyl groups per molecule, (II) an organic polyisocyanate, (III) a blowing agent, (IV) a catalyst comprising an amine for the reaction of the polyester polyol and the polyisocyanate to produce the polyurethane, and (V) a liquid siloxane-oxyalkylene polymeric foam stabilizer containing monomeric units (A), (B) and (C) where: (A) is $SiO_{4/2}$; (B) has the structure of at least one of the units encompassed by the formula, $$WO-(C_nH_{2n}O)_d-C_mH_{2m}-\underset{\underset{R}{|}}{Si}O_{2/2}$$

wherein R is a monovalent hydrocarbon radical having from 1 to 12 carbon atoms, $d$ has an average value of from about 5 to about 15, $n$ has a value of from 2 to 4, provided at least 75 percent by weight of the poly(oxyalkylene) chain, —$(C_nH_{2n}O)_d$—, is constituted of oxyethylene units, $m$ has a value of from 2 to 4, and W is a monovalent organic radical selected from the group consisting of R°°—, R°°NHC(O)— and R°°C(O)— where R°° is a monovalent hydrocarbon radical having from 1 to 12 carbon atoms; and (C) has the unit formula, $$R'_3SiO_{1/2}$$

wherein R' is a monovalent hydrocarbon radical having from 1 to 12 carbon atoms; and wherein there are from about 0.4 to about 2 moles of $SiO_{4/2}$ units per mole of (B), and from about 0.2 to about 2 moles of (C) per mole of (B), said foam stabilizer having a siloxane content of from about 15 to about 50 weight percent, based on the combined total weight of monomeric units (A), (B) and (C), the remaining weight of said units being constituted of said WO—$(C_nH_{2n}O)_d$—$C_mH_{2m}$— groups.

2. A process as defined in claim 1 wherein said monovalent hydrocarbon groups, R and R', of the respective (B) and (C) units of the polymeric foam stabilizer are lower alkyl groups.

3. A process as defined in claim 2 wherein said R and R' groups are methyl groups and said R group is selected from the group consisting of a lower alkyl radical and an aryl-substituted lower alkyl radical.

4. A polyurethane foam produced in accordance with the process as defined in claim 3.

5. The polyurethane foam as defined in claim 4 which additionally contains an organic phosphorus-containing flame retardant.

6. A process as defined in claim 1 wherein the blowing agent comprises water, and the said catalyst comprising an amine and said foam stabilizer are introduced to the reaction mixture as an aqueous premixture, the said aqueous premixture containing as additional components, (1) a liquid fatty acid component, (2) a silicon-free, water soluble non ionic organic surfactant wherein the hydrophilic portion is composed essentially of oxyethylene units and the hydrophobic portion is derived form a hydrophobe selected from at least one of the group consisting of alcohols having from 10 to 18 carbon atoms and alkyl-substituted phenols in which the alkyl substituent has from 6 to 15 carbon atoms, and (3) a glycol.

7. A process as defined in claim 6 wherein said liquid fatty acid is tall oil and said glycol is hexylene glycol.

8. A process as defined in claim 1 in which R, R' and W are methyl, and $m$ has a value of three.

9. A process as defined in claim 1 in which R and R' are methyl, W is benzyl, and $m$ has a value of three.

10. A process for producing a flexible polyurethane foam by reacting and foaming a mixture of (a) a polyester containing an average of at least two hydroxyl groups per molecule, (b) an organic polyisocyanate, (c) a catalyst for the reaction of (a) and (b) to produce the polyurethane, (d) a blowing agent, and (e) a fluid siloxane-oxyalkylene polymeric foam stabilizer containing reoccurring monomeric units (A), (B) and (C) where:

(A) is $SiO_{4/2}$ (B) has the unit formula, $$[WO-(C_nH_{2n}O)_d-L-]_e\underset{\underset{R_f}{|}}{Si}O_{\frac{4-(e+f)}{2}}$$

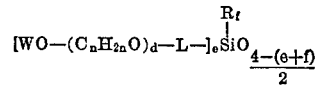

wherein R is a monovalent hydrocarbon group having from 1 to 12 carbon atoms, $d$ has an average value of from about 4 to about 30, $n$ has a value of from 2 to 4, provided at least 75 percent by weight of the poly(oxyalkylene) chain, $$-(C_nH_{2n}O)_d-$$

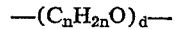

is constituted of oxyethylene units, —L— is a bivalent hydrocarbon radical having from 2 to 14 carbon atoms, W is a monovalent organic radical selected from the group consisting of R°°—, $$R°°NHC(O)-$$

and R°°C(O)— where R°° is a monovalent hydrocarbon radical having from 1 to 12 carbon atoms, $e$ has a value of from 1 to 2 and $f$ is from zero to 1, provided the sum $e+f$ is from 1 to 2; and (C) has the unit formula, $$\left[WO-(C_nH_{2n}O)_d-L-\right]_g\underset{\underset{R'_h}{|}}{Si}O_{\frac{4-(g+H)}{2}}$$

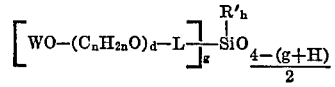

wherein R' is a monovalent hydrocarbon group having from 1 to 12 carbon atoms, $d$, $n$ W and —L— are as aforesaid, and each of $g$ and $h$ has a value of zero to 3, provided the sum $g+h$ is 3;

the said polymeric foam stabilizer containing from about 0.4 to about 2 moles of (A) per mole of (B) and from about 0.2 to about 2 moles of (C) per mole of (B) and having a siloxane content of from about 15 to about 50 weight percent, based on the combined total weight of monomeric units (A), (B) and (C), the remaining weight being constituted of said [WO—$(C_nH_{2n}O)_d$—L—] groups.

11. A flame-retarded flexible polyester urethane foam that comprises the reaction product of the process which comprises simultaneously reacting and foaming a reaction mixture of: (I) a polyester polyol having a hydroxyl number of from 30 to 150, (II) an organic polyisocyanate, (III) a catalyst comprising an amine for the reaction of (I) and (II) to produce the polyurethane, (IV) a blowing agent, (V) an organic flame retardant, and (VI) a liquid siloxane-oxyalkylene polymeric foam stabilizer containing reoccurring monomeric units (A), (B) and (C), wherein (A) is $SiO_{4/2}$, (B) has the structure of at least one of the units encompassed by the formula,

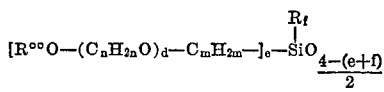

wherein R is a monovalent hydrocarbon group having from 1 to 12 carbon atoms, $d$ has an average value of from about 5 to about 15, $n$ has a value of from 2 to 4, provided at least 75 percent by weight of the poly(oxyalkylene) chain, —$(C_nH_{2n}O)_d$—, is constituted of oxyethylene units, $m$ has a value of from 2 to 4, $R°°$ is a monovalent hydrocarbon radical having from 1 to 12 carbon atoms, $e$ has a value of from 1 to 2 and $f$ is from zero to 1, provided the sum $e+f$ is from 1 to 2, and (C) has the structure of at least one of the units encompassed by the formula,

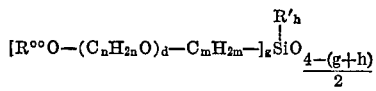

wherein R′ is a monovalent hydrocarbon group having from 1 to 12 carbon atoms, $d$, $n$, $m$ and $R°°$ are as aforesaid, each of $g$ and $h$ has a value of from zero to 3, provided the sum $g+h$ is 3, and the mole ratio of the said (A):(B):(C) units is about 0.4–2:1:0.2–2, the said polymeric foam stabilizer having a siloxane content of from about 15 to about 50 weight percent, based on the combined total weight of monomeric units (A), (B) and (C), the remaining weight being constituted of said $R°°O$—$(C_nH_{2n}O)_d$—$C_mH_{2m}$— groups.

12. A process as defined in claim 1 wherein the blowing agent comprises water, and the said catalyst comprising an amine and said foam stabilizer are introduced to the reaction mixture as an aqueous premixture, the said aqueous premixture containing as additional components, (1) a liquid fatty acid component, (2) a silicon-free, water soluble organic surfactant selected from the group consisting of diethylamine salts of sulfonated $C_{10}$–$C_{15}$ alkylated aromatic hydrocarbons and sodium, potassium, ammonium and quaternary ammonium salts of sulfonic acids wherein the hydrocarbyl portion contains from 10 to 20 carbon atoms and is alkyl or alkaryl, and (3) a glycol.

13. A solution composition comprising components (1), (2), (3), (4), (5) and (6) wherein: component (1) is a liquid siloxane-oxyalkylene polymer containing monomeric units (A), (B) and C) where (A) is $SiO_{4/2}$ (B) is a siloxy unit having the formula,

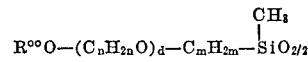

wherein $d$ has an average value of from about 5 to about 15, $n$ has a value of from 2 to 4, provided at least 75 percent by weight of the poly(oxyalkylene) chain,

is constituted of oxyethylene units, $m$ has a value of from 2 to 4 and $R°°$ is a monovalent hydrocarbon radical having from 1 to 12 carbon atoms, and (C) is the siloxy unit $(CH_3)_3SiO_{1/2}$, the mole ratio of said (A) to (B) to (C) units being about 0.4–2:1:0.2–2, respectively, said polymer having a siloxane content of from about 15 to about 50 weight percent, based on the combined total weight of units (A), (B) and (C), the remaining weight being constituted of said $R°°O$—$(C_nH_{2n}O)_d$—$C_mH_{2m}$— groups; component (2) is tall oil present in said solution in an amount of from about 5 to about 90 parts by weight per 100 parts by weight of said polymer contained in said solution; component (3) is a non ionic organic surfactant in which the hyrophilic portion is comprised of oxyethylene units and the hydrophobic portion is derived from a hydrophobe selected from the group consisting of an alcohol having from 10 to 18 carbon atoms and an alkyl-substituted phenol in which the alkyl substituent has from 6 to 15 carbon atoms; component (4) is hexylene glycol, the combined total weight of components (3) and (4) present in said solution ranging from about 5 to about 90 parts by weight per 100 parts by weight of said polymer contained in the solution; component (5) is water; and component (6) is an amine catalyst for the urethane-forming reaction of a polyester polyol and an organic polyisocyanate.

14. A process as defined in claim 10 wherein the mixture contains an organic flame retardant.

15. The polyurethane foam produced in accordance with the process defined in claim 10.

References Cited

UNITED STATES PATENTS

| | | | |
|---|---|---|---|
| 3,634,344 | 1/1972 | Koerner | 260—2.5 AH |
| 3,637,541 | 1/1972 | Rossmy | 260—2.5 AH |
| 3,541,127 | 11/1970 | Beattie | 260—2.5 AH |
| 3,511,788 | 5/1970 | Keil | 260—18 TN |
| 3,299,113 | 1/1967 | Haluska | 260—448.8 |

FOREIGN PATENTS

| | | | |
|---|---|---|---|
| 1,471,736 | 3/1967 | France | 260—2.5 AH |

DONALD E. CZAJA, Primary Examiner

C. W. IVY, Assistant Examiner

U.S. Cl. X.R.

252—351, Dig. 1, 356; 260—2.5 AG, 2.5 AN